United States Patent
Yamagami et al.

(10) Patent No.: US 10,029,180 B2
(45) Date of Patent: Jul. 24, 2018

(54) STORAGE MEDIUM HAVING STORED THEREIN GAME PROGRAM, GAME APPARATUS, GAME SYSTEM, AND GAME PROCESSING METHOD

(71) Applicant: NINTENDO CO., LTD., Kyoto (JP)

(72) Inventors: Hitoshi Yamagami, Kyoto (JP); Kazuhiro Yoshikawa, Kyoto (JP); Yuya Ishii, Kyoto (JP); Susumu Ishihara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 249 days.

(21) Appl. No.: 14/644,401

(22) Filed: Mar. 11, 2015

(65) Prior Publication Data
US 2016/0263481 A1  Sep. 15, 2016

(51) Int. Cl.
*A63F 13/77* (2014.01)
*A63F 13/46* (2014.01)
*A63F 13/69* (2014.01)
*A63F 13/825* (2014.01)
*A63F 13/525* (2014.01)

(52) U.S. Cl.
CPC .............. *A63F 13/46* (2014.09); *A63F 13/69* (2014.09); *A63F 13/525* (2014.09); *A63F 13/825* (2014.09)

(58) Field of Classification Search
CPC ................. A63F 13/46; A63F 13/825
See application file for complete search history.

(56) References Cited

U.S. PATENT DOCUMENTS

| 7,106,361 | B2 | 9/2006 | Kanade et al. |
| 7,690,992 | B2 | 4/2010 | Itou et al. |
| 8,764,533 | B2 | 7/2014 | Ohara et al. |
| 8,884,987 | B2 | 11/2014 | Kitahara et al. |
| 9,081,436 | B1 | 7/2015 | Berme et al. |
| 2002/0145660 | A1 | 10/2002 | Kanade et al. |
| 2009/0042629 | A1 | 2/2009 | Yamashita et al. |
| 2010/0095249 | A1 | 4/2010 | Yoshikawa et al. |
| 2011/0250966 | A1 | 10/2011 | Ohara et al. |
| 2015/0231499 | A1 | 8/2015 | Mizukami |
| 2016/0263479 | A1 | 9/2016 | Yamagami et al. |

(Continued)

FOREIGN PATENT DOCUMENTS

JP  2009-039224  2/2009

OTHER PUBLICATIONS

An Unknown Enemy: The Optimal Strategy 2.0, Steam Community, https://steamcommunity.com/sharedfiles/filedetails/?id=136706470.*

(Continued)

*Primary Examiner* — James S McClellan
*Assistant Examiner* — Kevin Carter
(74) *Attorney, Agent, or Firm* — Nixon & Vanderhye P.C.

(57) ABSTRACT

A player character is caused to perform an action in accordance with an input. Action points that allow the player character to perform an action in a virtual world during a player turn are set, and a point is subtracted from the action points in accordance with the action of the player character during the player turn. The player turn is ended, and an opponent turn is started. Then, in causing the player character to perform an action, if the action points remain at a time of the end of the player turn, the player character is caused to automatically perform an action on a non-player character in the opponent turn.

14 Claims, 17 Drawing Sheets

(56) References Cited

U.S. PATENT DOCUMENTS

2016/0263481 A1 9/2016 Yamagami et al.
2017/0128833 A1 5/2017 Tsukioka et al.

OTHER PUBLICATIONS

Detecting the opponent | Turnbased combat system XCOM: Enemy Unknown Guide, gamepressure, http://guides.gamepressure.com/xcomenemyunknown/guide.asp?ID=16632.*
Warhammer 40,000: Squad Command, Giant Bomb, http://www.giantbomb.com/warhammer-40000-squad-command/3030-13936/.*
X-COM: Enemy Unknown and the 3 Fs of Thanksgiving Break, https://www.wired.com/2012/11/x-com-enemy-unknown/, dated Nov. 26, 2012.*
Overwatch (EU2012), http://www.ufopaedia.org/index.php/Overwatch_(EU2012).*
2K Forums, https://forums.2k.com/showthread.php?142716-Auto-Overwatch.*
U.S. Appl. No. 14/644,653, filed Mar. 11, 2015, Storage Medium Having Stored Therein Game Program, Game Apparatus, Game System, and Game Processing Method.
U.S. Appl. No. 14/644,401, filed Mar. 11, 2015, Storage Medium Having Stored Therein Game Program, Game Apparatus, Game System, and Game Processing Method.
Yamagami et al., U.S. Appl. No. 14/644,653, filed Mar. 11, 2015.
Notice of Allowance dated Nov. 9, 2017 issued in U.S. Appl. No. 14/644,653 (9 pgs.).
X-COM Enemy Unknown—E01 "Welcome to XCOM, Recruits"; https://www.youtube.com/watch?v=cfCqz_O9dKw; retrieved on Nov. 17, 2017.
Movement Turn-based combat system—XCOM: Enemy Unknown Game Guide gamepressure.com http://guides.gamepressure.com/xcomenemyunknown/guide.asp?ID=16631 downloaded Mar. 16, 2017 (5 pages).
Strike force Team and classes—XCOM: Enemy Unknown Game Guide gamepressure.com http://guides.gamepressure.com/xcomenemyunknown/guide.asp?ID=16940 downloaded Mar. 16, 2017 (4 pages).
Controls Controls—XCOM: Enemy Unknown Game Guide gamepressure.com http://guides.gamepressure.com/xcomenemyunknown/guide.asp?ID=16626 downloaded Mar. 16, 2017 (5 pages).
Shadow Watch (2000) https://www.giantbomb.com/shadow-watch/3030-4676 Shadow Watch guide manual downloaded From https://web.archive.org/web/20100101000000*/http://www.replacementdocs.com/download.php?view.79 (38 pages).
Valkyria Chronicles(PS3) (Sony Entertainment 2008), https://support.sega.co.uk/he/en~us/articles/202567512~Valkyria~Chronicles~1~Manural~PS3 (13 pages).
Office Action dated Jul. 14, 2017, issued in U.S. Appl. No. 14/644,653 by Yamagami, filed Mar. 11, 2015 (25 pages).
Shadow Watch (2000) https://www.giantbomb.com/shadow-watch/3030-467 Shadow Watch guide manual downloaded From https://web.archive.org/web/20100101000000*/http://www.replacementdocs.com/download.php?view.79 (38 pages).
Valkyria Chronicles(PS3) (Sony Entertainment 2008), https://support.sega.co.uk/he/en-us/articles/202567512-Valkyria-Chronicles-1-Manural-PS3 (13 pages).

* cited by examiner

F I G. 1 6
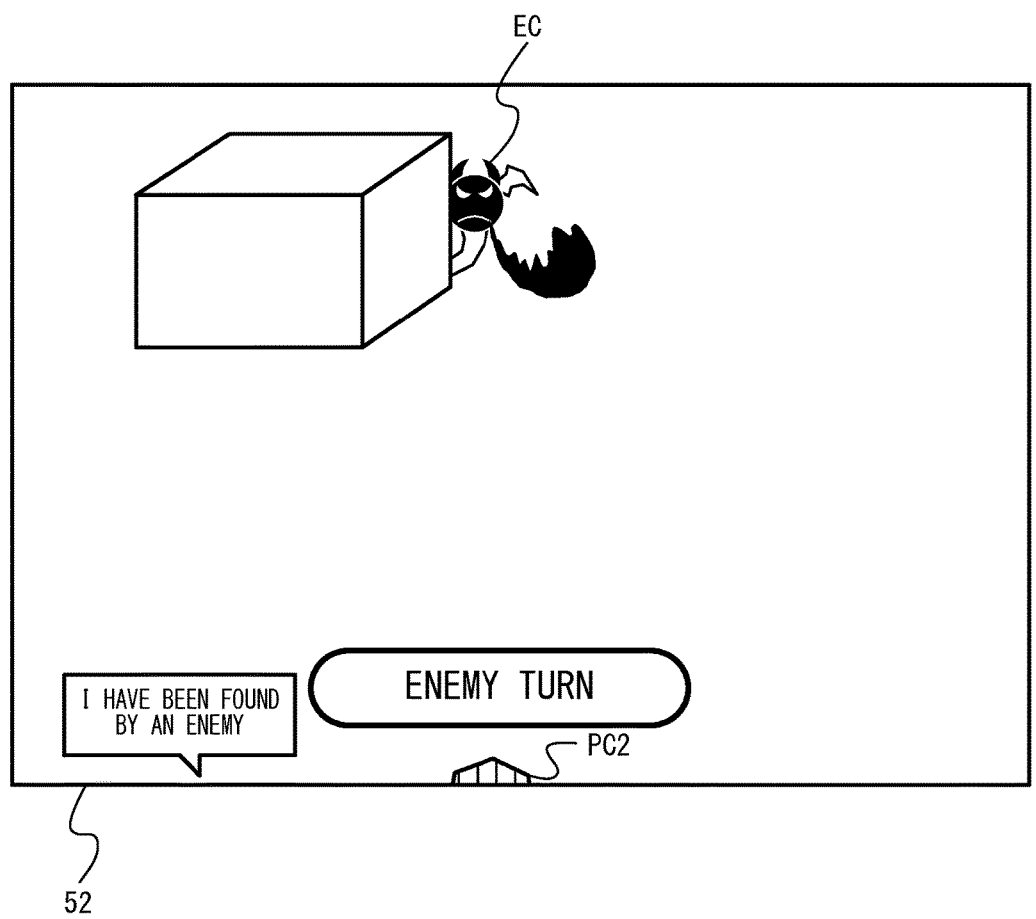

STORAGE MEDIUM HAVING STORED THEREIN GAME PROGRAM, GAME APPARATUS, GAME SYSTEM, AND GAME PROCESSING METHOD

FIELD

The technology shown here relates to a storage medium having stored therein a game program, a game apparatus, a game system, and a game processing method, and in particular, relates to a storage medium having stored therein a game program, a game apparatus, a game system, and a game processing method for, for example, performing a predetermined game in a virtual world.

BACKGROUND AND SUMMARY

Conventionally, there is a game apparatus for performing a turn-based versus game where a player turn and an opponent turn are repeated alternately. Further, in the game apparatus, a plurality of player characters may be able to be operated during a player turn.

In the game apparatus, however, a user can operate a player character during a player turn, but the user cannot control the player character during an opponent turn. This makes the level of strategy of a game poor during the opponent turn.

Therefore, it is an object of an exemplary embodiment to provide a storage medium having stored therein a game program, a game apparatus, a game system, and a game processing method that are capable of further increasing the level of strategy of a game.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of a storage medium having stored therein a game program according to an exemplary embodiment is executed by a computer capable of executing a game that advances by alternately repeating a player turn, in which a player character can perform an action in a virtual world in accordance with a player input, and an opponent turn, in which an opponent character can perform an action, the computer included in an information processing apparatus. The storage medium causes the computer to execute: acquiring an input; causing a player character to perform an action in accordance with the input; setting action points that allow the player character to perform an action in the virtual world during a player turn, and subtracting a point from the action points in accordance with the action of the player character during the player turn; setting in the virtual world a trigger range for triggering an action of the player character in the opponent turn; and ending the player turn and starting the opponent turn. In causing the player character to perform an action, if the action points remain at a time of the end of the player turn and if a non-player character has entered the trigger range in the opponent turn executed subsequently to the player turn, the player character is caused to automatically perform an action on the non-player character in the opponent turn.

Based on the above, action points that allow the action of a player character are left, a trigger range is set, and a player turn is ended, whereby it is possible to cause the player character to automatically perform an action in an opponent turn. This can further increase the level of strategy of a game.

In addition, in the setting of the trigger range, in accordance with the fact that a non-player object has performed a predetermined action on the player object in the opponent turn, a position of the trigger range may be changed based on a position of the non-player object.

Based on the above, the position of the trigger range is changed in accordance with the action of a non-player object performed on the player object. This can make the position of the trigger range flexible.

In addition, in the setting of the trigger range, in accordance with the fact that the player object has performed a predetermined action on a non-player object in the opponent turn, a position of the trigger range may be changed based on a position of the non-player object.

Based on the above, the position of the trigger range is changed in accordance with the action of the player object performed on a non-player object. This can make the position of the trigger range flexible.

In addition, in causing the player character to perform an action, if a non-player character has entered the trigger range in the opponent turn, and then, the non-player character has moved out of the trigger range within a predetermined time, the automatic action may not be performed on the non-player character.

Based on the above, even if a non-player character enters the trigger range but if the non-player character moves out of the trigger range within a predetermined time, it is possible to avoid the automatic action of the player character. This makes it possible to perform a game with a higher level of strategy.

In addition, under the condition that the action points remain at a time of the end of the player turn and a non-player character has entered the trigger range in the opponent turn executed subsequently to the player turn, an action to be performed on the non-player character by the player character may be a specific action that can be performed if the condition is satisfied.

Based on the above, the action to be automatically performed by the player character in the opponent turn is a specific action to be performed on a non-player character. This makes it also possible to give the non-player character an effect specific to the action.

Another exemplary configuration of the storage medium having stored therein the game program according to the exemplary embodiment is executed by a computer capable of executing a game that advances by alternately repeating a player turn, in which a player character can perform an action in a virtual world in accordance with a player input, and an opponent turn, in which an opponent character can perform an action, the computer included in an information processing apparatus. The storage medium causes the computer to execute: acquiring an input; causing a player character to perform an action in accordance with the input; setting action points that allow the player character to perform an action in the virtual world during a player turn, and subtracting a point from the action points in accordance with the action of the player character during the player turn; and ending the player turn and starting the opponent turn. In causing the player character to perform an action, if the action points remain at a time of the end of the player turn, an automatic action of the player character corresponding to the number of the remaining action points is automatically enabled in the opponent turn executed subsequently to the player turn.

Based on the above, action points that allow the action of a player character are left, and a player turn is ended, whereby it is possible to cause the player character to automatically perform an action in accordance with the action points in an opponent turn. This can further increase the level of strategy of a game.

In addition, in causing the player character to perform an action, if the action points remain at the time of the end of the player turn, an automatic action of the player character may be automatically enabled the number of times corresponding to the number of the remaining action points in the opponent turn executed subsequently to the player turn.

Based on the above, action points that allow the action of a player character are left, and a player turn is ended, whereby it is possible to cause the player character to automatically perform an action the number of times corresponding to the number of the remaining action points in the opponent turn. This can further increase the level of strategy of the game.

In addition, under the condition that the action points remain at the time of the end of the player turn, an action to be automatically performed by the player character in the opponent turn may be a specific action that can be performed if the condition is satisfied.

Based on the above, the action to be automatically performed by the player character in the opponent turn is a specific action to be performed on a non-player character. This makes it also possible to give the non-player character an effect specific to the action.

In addition, the exemplary embodiment may be carried out in the forms of a game apparatus, a game system, and a game processing method.

These and other objects, features, aspects and advantages of the exemplary embodiments will become more apparent from the following detailed description of the exemplary embodiments when taken in conjunction with the accompanying drawings.

According to the exemplary embodiment, it is possible to further increase the level of strategy of a game.

BRIEF DESCRIPTION OF THE DRAWINGS

FIG. 16 is a diagram showing a non-limiting second example of the game image of the virtual world displayed on the display section 52 in the enemy turn;

DETAILED DESCRIPTION OF NON-LIMITING EXAMPLE EMBODIMENTS

Figure 1:
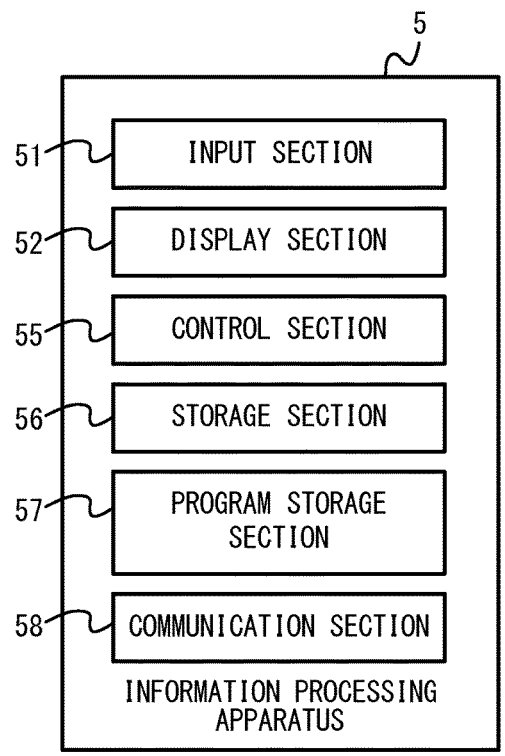
FIG. 1 is a block diagram showing a non-limiting example of an information processing apparatus 5.

With reference to FIG. 1, a description is given of an information processing apparatus for executing a game program according to an exemplary embodiment. It should be noted that FIG. 1 is a block diagram showing an example of an information processing apparatus 5. For example, the information processing apparatus 5 can execute a program stored in a storage medium such as an exchangeable memory card or an exchangeable optical disk, or received from another apparatus. The information processing apparatus 5 may be a mobile game apparatus, or may be a device such as a general personal computer, a mobile phone, or a PDA (Personal Digital Assistant).

The information processing apparatus 5 includes an input section 51, a display section 52, a control section 55, a storage section 6, a program storage section 57, a communication section 58, and the like. It should be noted that the information processing apparatus 5 may be composed of one or more apparatuses including: an information processing apparatus having at least the control section 55; and another apparatus.

The control section 55 is information processing means (a computer) for performing various types of information processing, and is, for example, a CPU. For example, the control section 55 has the functions of executing the program to perform game processing described later and the like, as the various types of information processing. For example, the above functions of the control section 55 are achieved, for example, by the CPU executing a predetermined program.

The storage section 56 stores various pieces of data used when the control section 55 performs the above information processing. The storage section 56 is, for example, a memory accessible by the CPU (the control section 55).

The program storage section 57 stores a program. The program storage section 57 may be any storage device (storage medium) accessible by the control section 55. For example, the program storage section 57 may be a storage device provided in the information processing apparatus having the control section 55, or may be a storage medium detachably attached to the information processing apparatus having the control section 55. Alternatively, the program storage section 57 may be a storage device (a server or the like) connected to the control section 55 via a network. The control section 55 (the CPU) may read part or all of a game program to the storage section 56 at appropriate timing and execute the read program.

The input section 51 is an input apparatus that can be operated by a user. The input section 51 may be any input apparatus.

The display section 52 displays an image in accordance with an instruction from the control section 55. The display section 52 is an example of a display apparatus included in the information processing apparatus 5 and may be composed of an LCD (Liquid Crystal Display). Further, the display section 52 may be a display apparatus capable of displaying a stereoscopically visible image by displaying a left-eye image and a right-eye image using substantially the same display area. It should be noted that if the information processing apparatus 5 is composed of a stationary game apparatus or a personal computer, the display section 52 can be composed separately from the information processing apparatus 5.

The communication section 58 is composed of a predetermined communication module. The communication section 58 transmits and receives data to and from another device (e.g., a server) directly or via a network, and transmits and receives data to and from another information processing apparatus 5 directly or via a network.

Figure 9:
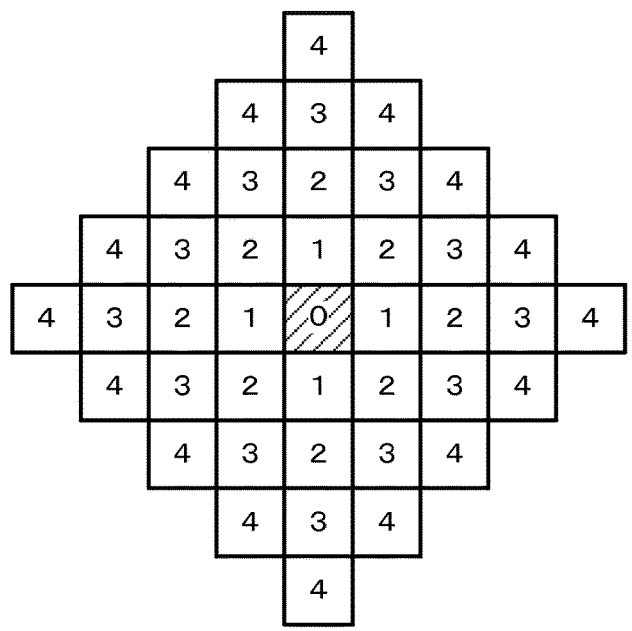
FIG. 9 is a diagram showing non-limiting examples of action points consumed when a player character moves in the player turn.
Figure 10:
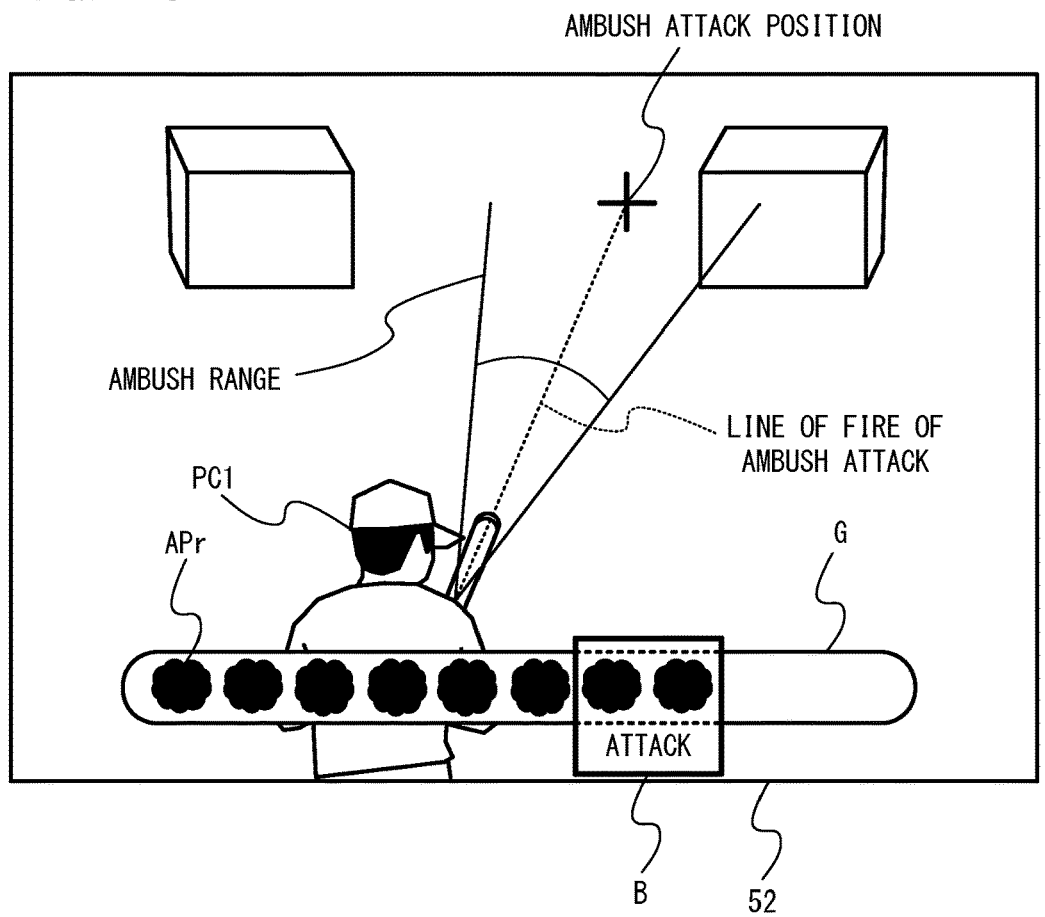
FIG. 10 is a diagram showing a non-limiting second example of the game image of the virtual world displayed on the display section 52 in the player turn.
Figure 11:
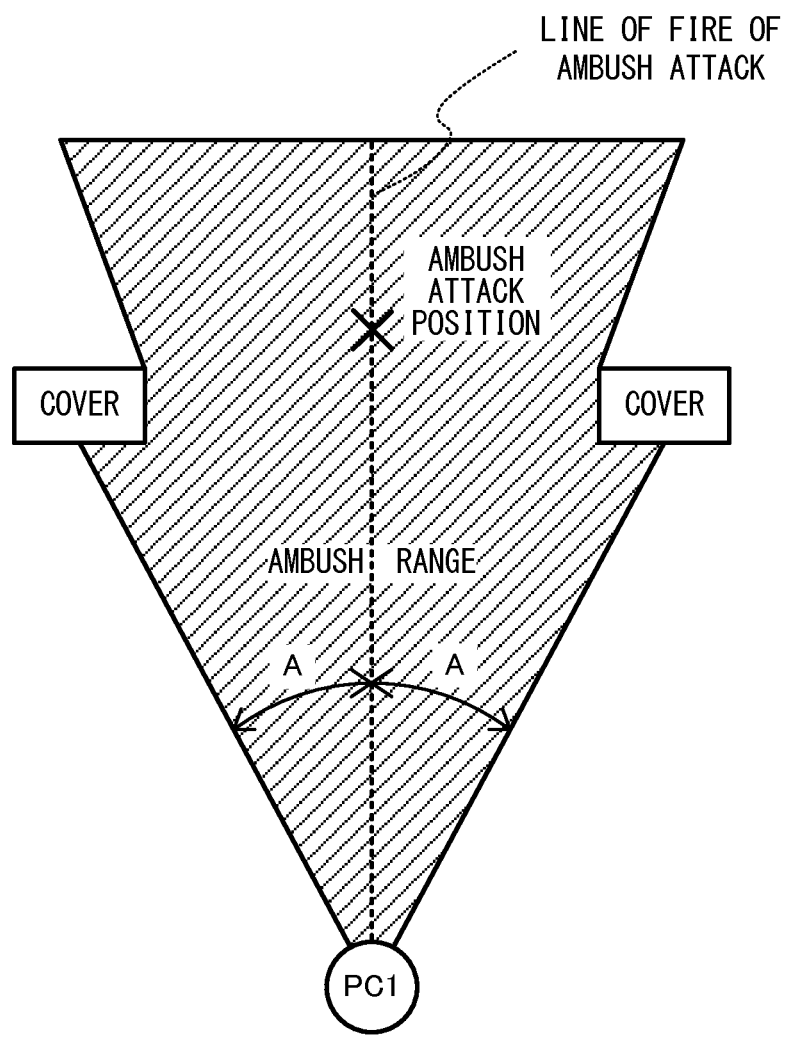
FIG. 11 is a diagram showing a non-limiting example of an ambush range set in the player turn.
Figure 12:
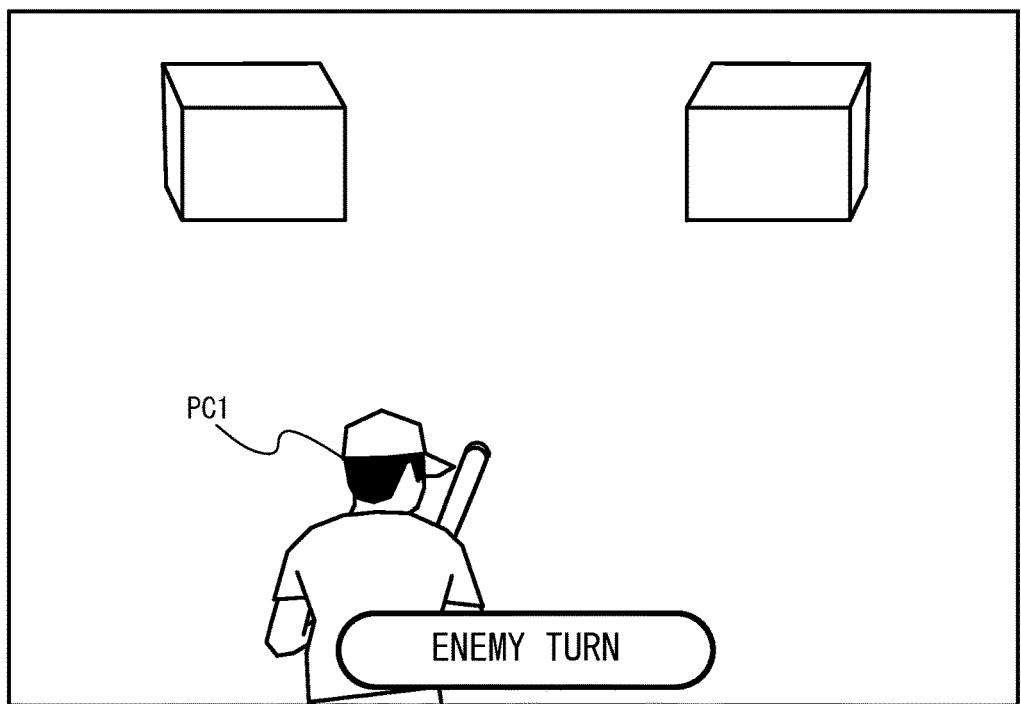
FIG. 12 is a diagram showing a non-limiting first example of a game image of the virtual world displayed on the display section 52 in an enemy turn.
Figure 13:
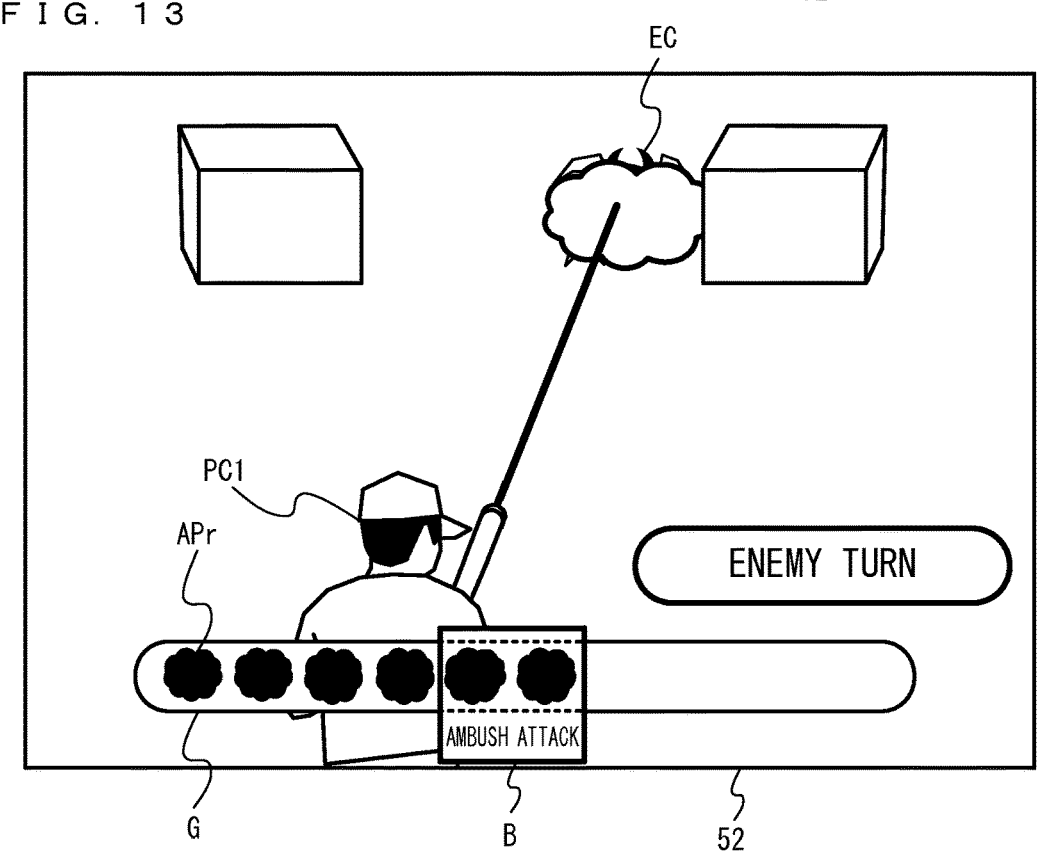
FIG. 13 is a diagram showing the non-limiting first example of the game image of the virtual world displayed on the display section 52 in the enemy turn.
Figure 14:
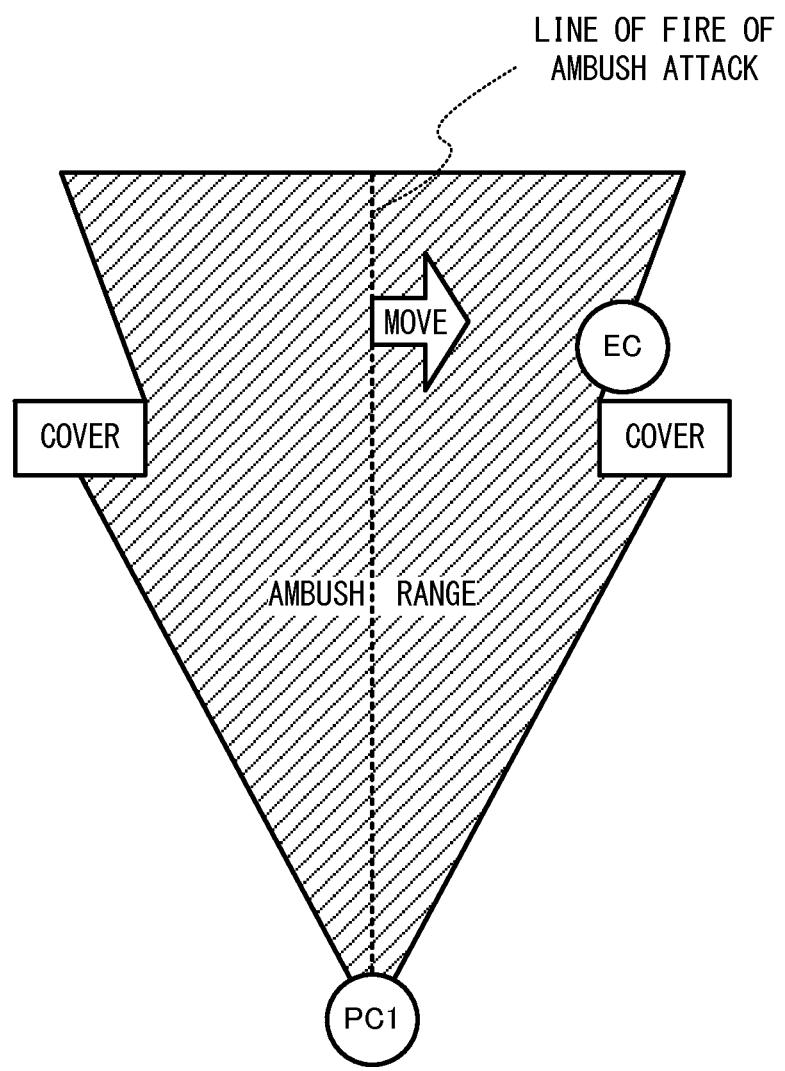
FIG. 14 is a diagram showing a non-limiting example where the line of fire of an ambush attack and an ambush range move.
Figure 15:
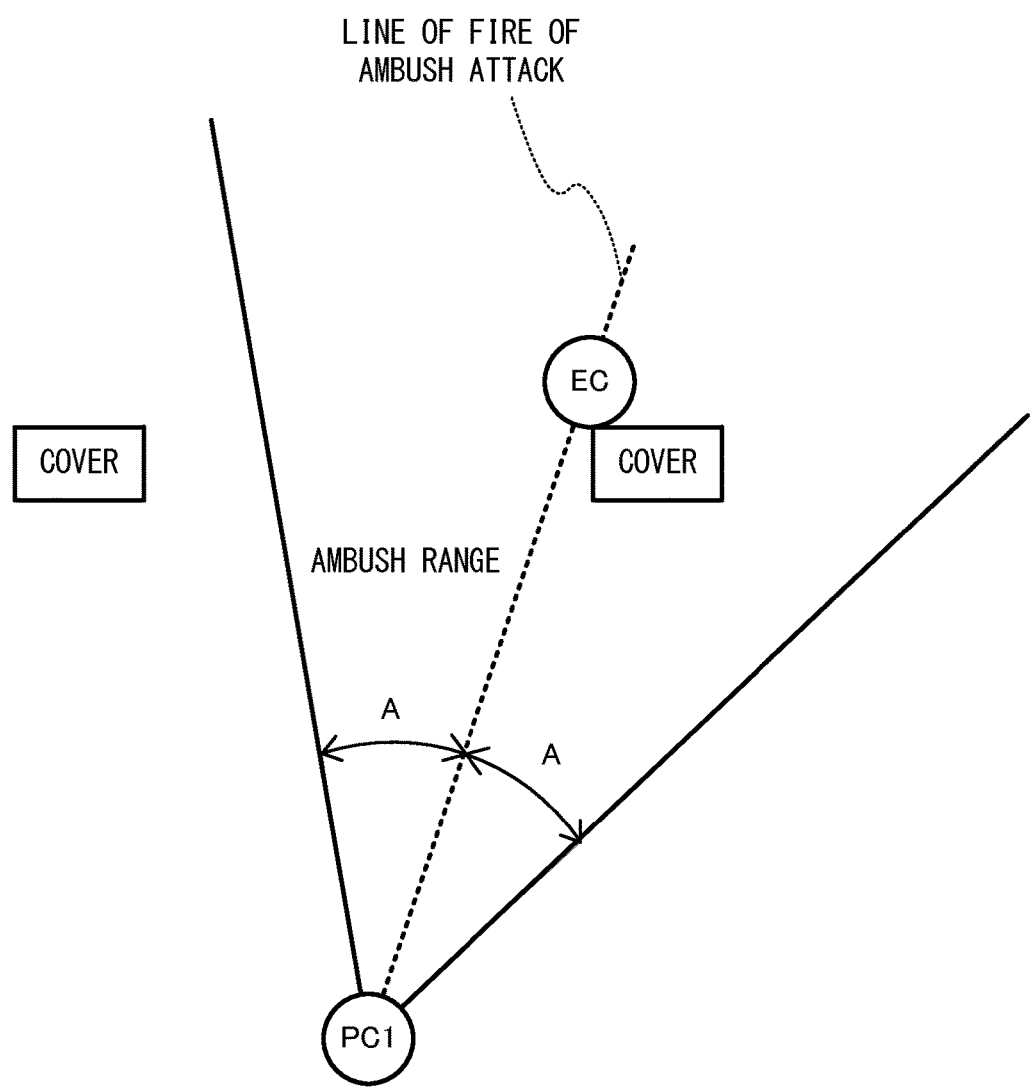
FIG. 15 is a diagram showing the non-limiting example where the line of fire of an ambush attack and the ambush range move.

Next, with reference to FIGS. 2 to 16, a description is given of an overview of information processing performed by the information processing apparatus 5, before the description of specific processing performed by the information processing apparatus 5. It should be noted that the following descriptions are given taking, as an example of the information processing, game processing for performing a turn-based versus game where a player turn and an opponent turn (an enemy turn) are repeated alternately. FIGS. 2 to 8 are diagrams showing a first example of a game image of a virtual world displayed on the display section 52 in a player turn. FIG. 9 is a diagram showing examples of action points consumed when a player character moves in the player turn. FIG. 10 is a diagram showing a second example of the game image of the virtual world displayed on the display section 52 in the player turn. FIG. 11 is a diagram showing an example of an ambush range set in the player turn. FIGS. 12 and 13 are diagrams showing a first example of a game image of the virtual world displayed on the display section 52 in an enemy turn. FIGS. 14 and 15 are diagrams showing an example where the line of fire of an ambush attack and an ambush range move. FIG. 16 is a diagram showing a second example of the game image of the virtual world displayed on the display section 52 in the enemy turn.

In the exemplary embodiment, as an example, a game image is displayed on the display section 52, and a turn-based versus game is performed, where a player turn, in which a player operates a player character, and an opponent turn (an enemy turn), in which a computer as an opponent operates a non-player character (an enemy character), are repeated alternately. For example, a user operates the input section 51 during a player turn and thereby can operate a plurality of player characters placed in a virtual world. Then, the virtual world viewed from a virtual camera corresponding to one of the player characters as an operation target (for example, a virtual camera having a third-person point of view following the player character as the operation target, and also a virtual camera having a point of view at the back of the player character and having a fixation point in the forward direction of the player character) is displayed on the display section 52.

Figure 2:
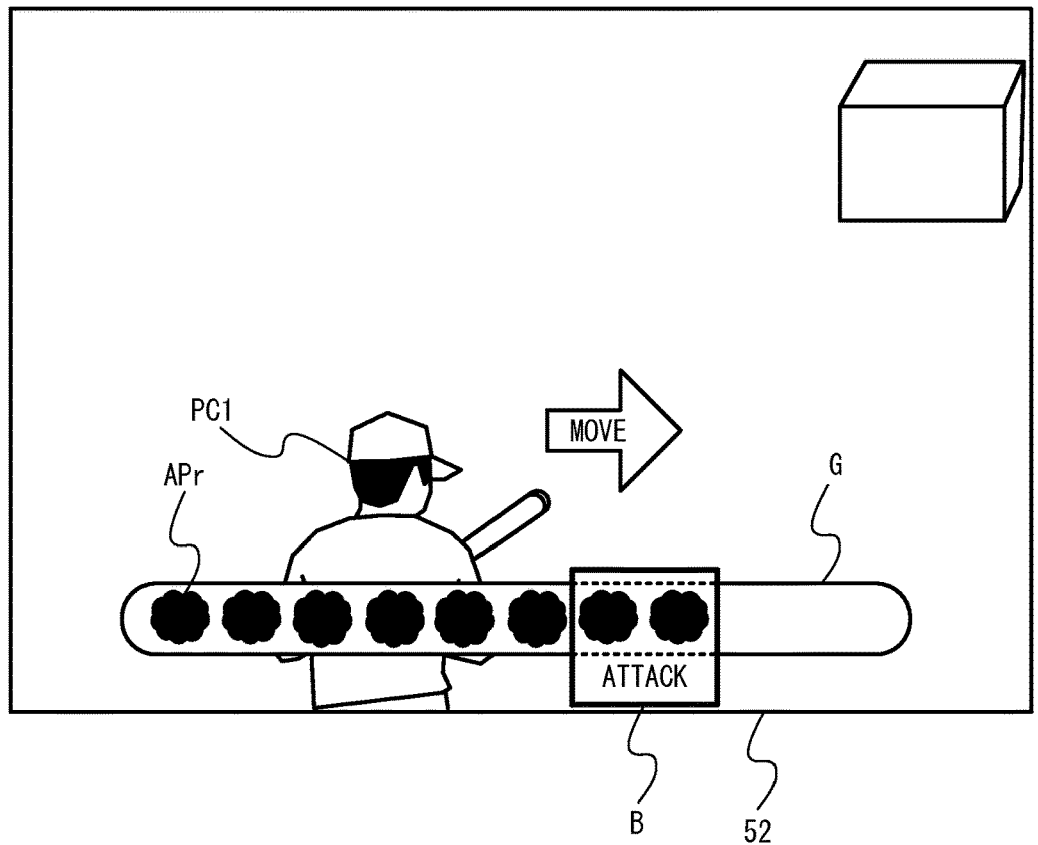
FIG. 2 is a diagram showing a non-limiting first example of a game image of a virtual world displayed on a display section 52 in a player turn.

FIG. 2 shows an example of a game image displayed on the display section 52 when a first player character PC1, which is one of the plurality of player characters, is selected to perform an operation in the versus game. In the versus game, the user performs a predetermined operation using the input section 51 and thereby can select a player character to be operated during a player turn (an operation target character) from among the plurality of player characters. Then, on a game screen, an action point gauge G is displayed, which indicates action points that allow the operation target character to perform an action during the current player turn. The operation target character can perform an action corresponding to the number of action points during the current player turn.

In the example of FIG. 2, as the action points of the first player character PC1 that is the operation target character, eight remaining action point images APr are displayed, which serve as indicators indicating the number of remaining action points. Here, the operation target character moves in the virtual world or performs the action of attacking an enemy character during the player turn, whereby the remaining action points are consumed by the number of action points corresponding to the content of the action. Then, if the remaining action points become 0, the operation target character cannot perform an action during the current player turn, except for a "return action" described later. Further, in the action point gauge G, an attack consumption frame image B is provided and displayed, which serves as an indicator indicating the number of remaining action points to be consumed when the first player character PC1 as the operation target character attacks an enemy character. For example, in the example of FIG. 2, two remaining action point images APr are displayed in the frame of the attack consumption frame image B to indicate that if the first player character PC1 performs the action of attacking an enemy character, two remaining action points are to be consumed.

Figure 3:
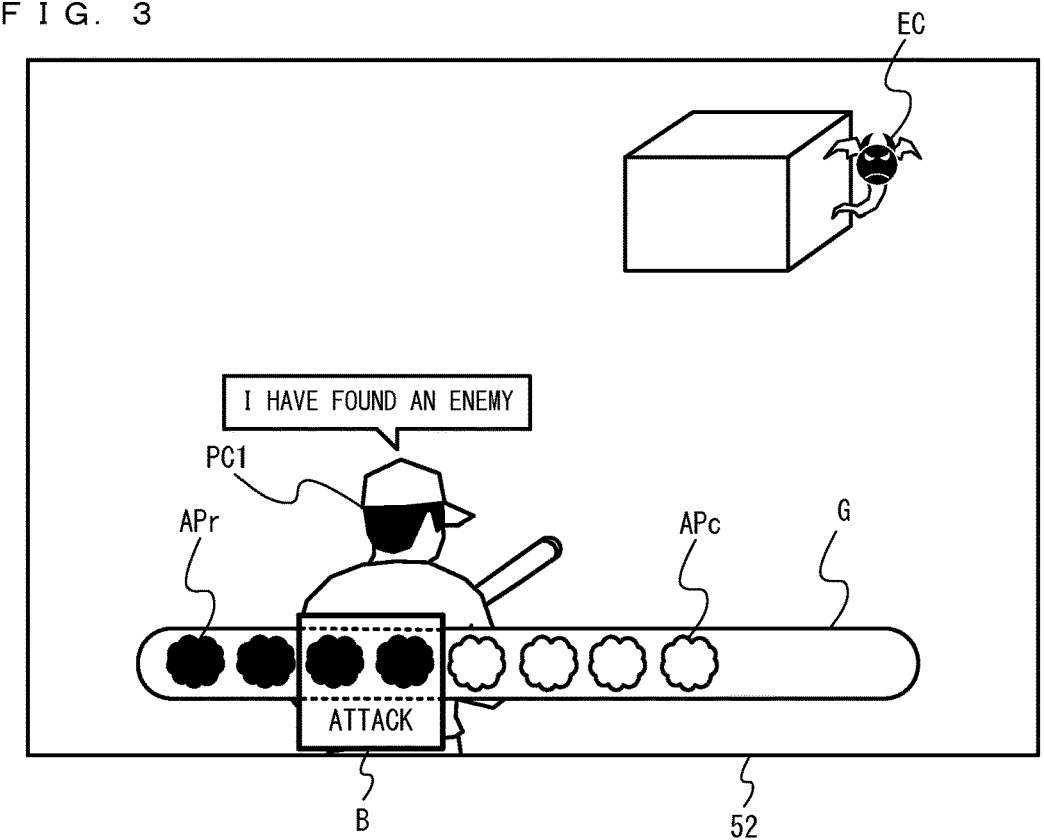
FIG. 3 is a diagram showing the non-limiting first example of the game image of the virtual world displayed on the display section 52 in the player turn.

An example of FIG. 3 shows an example of the game screen that has moved from the position of the first player character PC1 shown in FIG. 2 to the right (that is, has moved in the direction of an arrow shown in FIG. 2) at a moving distance corresponding to four remaining action points. In this case, four remaining action point images APr among the eight remaining action point images APr displayed in the action point gauge G are changed to consumption action point images APc and displayed to indicate to the user that four remaining action points have been consumed by the above movement. Then, in accordance with the consumption of the remaining action points, the attack consumption frame image B also moves to the position where the remaining action point images APr are continuously displayed, and two remaining action point images APr are displayed in the frame of the attack consumption frame image B.

In addition, in the example of FIG. 3, the first player character PC1 has moved, whereby an enemy object EC, which had hidden behind a cover set in the virtual world, has entered the field of view of the first player character PC1. Thus, the first player character PC1 has found the enemy object EC. Consequently, words indicating that the first player character PC1 has found the enemy object EC are displayed on the display section 52, thereby notifying the user of this.

Figure 4:
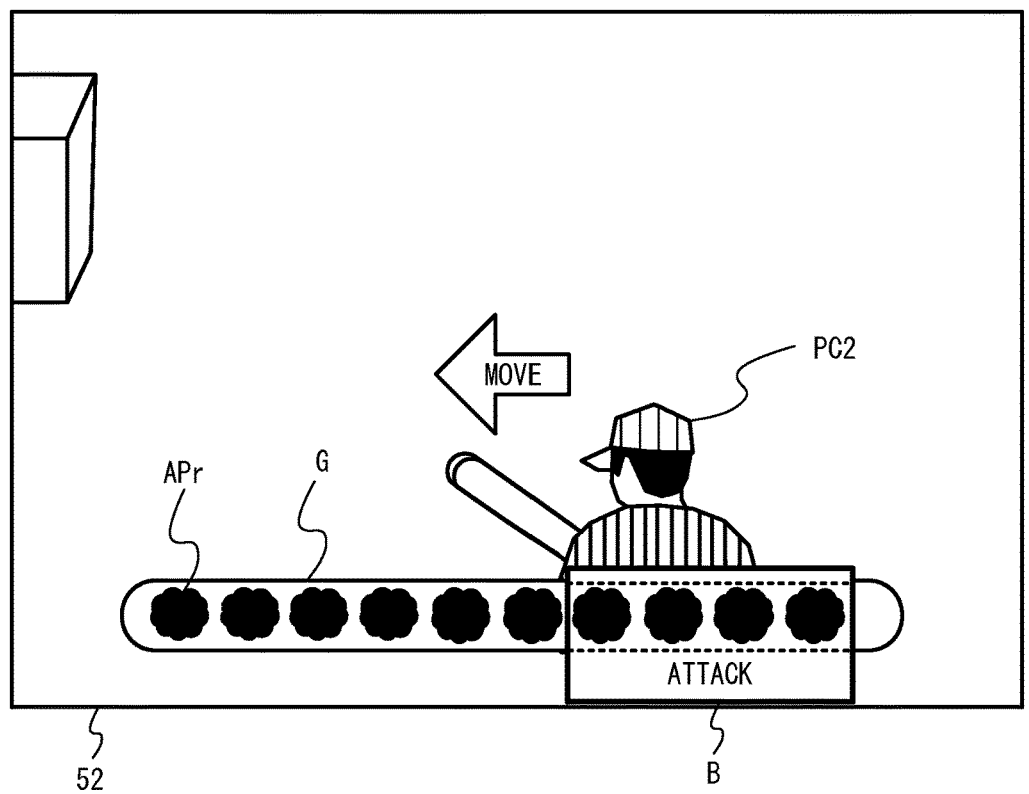
FIG. 4 is a diagram showing the non-limiting first example of the game image of the virtual world displayed on the display section 52 in the player turn.

An example of FIG. 4 shows an example of the game screen in which, after the movement of the first player character PC1 shown in FIG. 3, the operation target character has been switched to a second player character PC2 during the same player turn. In this case, the operation target character has been changed, and therefore, the virtual world viewed from a virtual camera corresponding to the second player character PC2 having newly become the operation target is displayed on the display section 52. Then, on the game screen, an action point gauge G is newly displayed, which indicates action points that allow the second player character PC2, newly selected as the operation target character, to perform an action during the current player turn. As an example, in the example of FIG. 4, the number of action points of the second player character PC2 newly selected as the operation target character is 10. Thus, 10 remaining action point images APr are displayed, which serve as indicators indicating the number of remaining action points. Further, in the action point gauge G shown in FIG. 4, four remaining action point images APr are displayed in the frame of an attack consumption frame image B to indicate that if the second player character PC2 performs the action of attacking an enemy character, four remaining action points are to be consumed. As described above, in the versus game, with respect to each player character that can be selected during the same player turn, action points are individually set that allow the player character to perform an action during the player turn. Further, in the versus game, the user performs a predetermined operation using the input section 51 and thereby can switch the operation target character to be operated during the same player turn.

Figure 5:
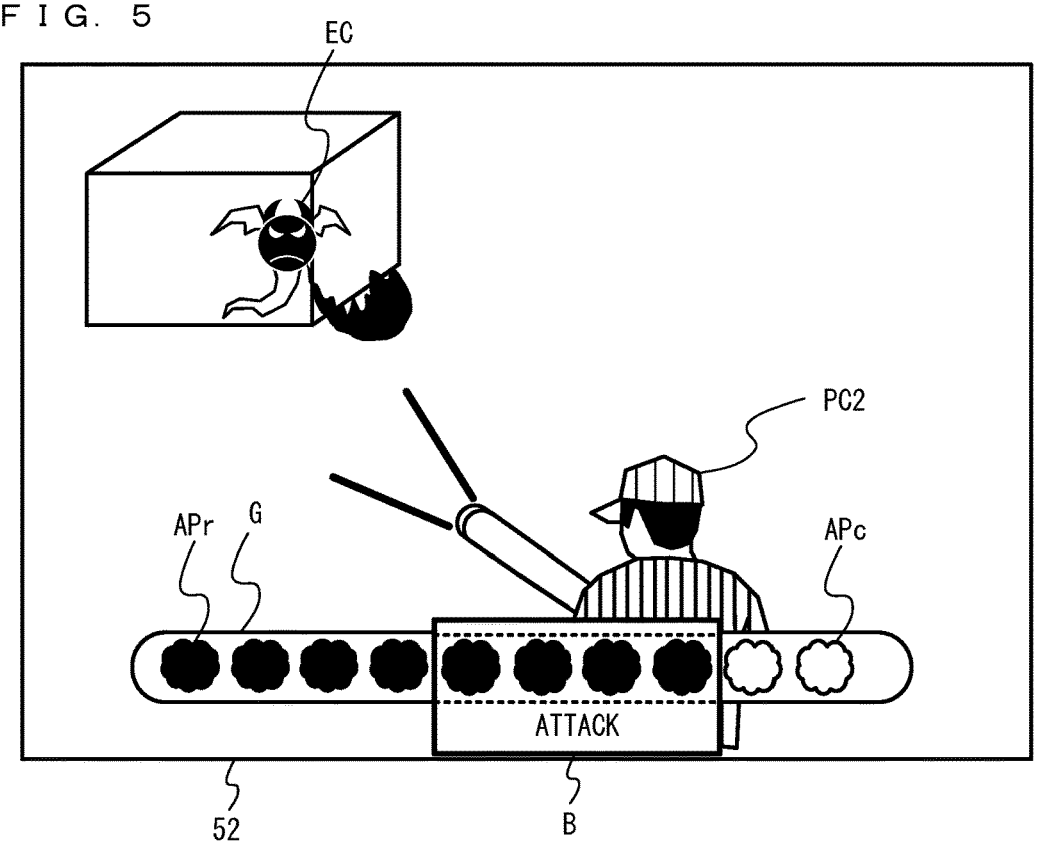
FIG. 5 is a diagram showing the non-limiting first example of the game image of the virtual world displayed on the display section 52 in the player turn.

An example of FIG. 5 shows an example of the game screen that has moved from the position of the second player character PC2 shown in FIG. 4 to the left (that is, has moved in the direction of an arrow shown in FIG. 4) at a moving distance corresponding to two remaining action points. In this case, two remaining action point images APr among the 10 remaining action point images APr displayed on the action point gauge G are changed to consumption action point images APc and displayed to indicate to the user that two remaining action points have been consumed by the above movement. Then, in accordance with the consumption of the remaining action points, the attack consumption frame image B also moves to the position where the remaining action point images APr are continuously displayed, and four remaining action point images APr are displayed in the frame of the attack consumption frame image B.

Then, in the example of FIG. 5, the second player character PC2 has moved, whereby the enemy object EC found by the first player character PC1 has entered the range where the second player character PC2 can make an attack. Thus, the second player character PC2 is attacking the enemy object EC. As described above, it is possible to make an advantageous attack using information obtained from another player character (information that the first player character PC1 has found the enemy character EC in this example).

Figure 6:
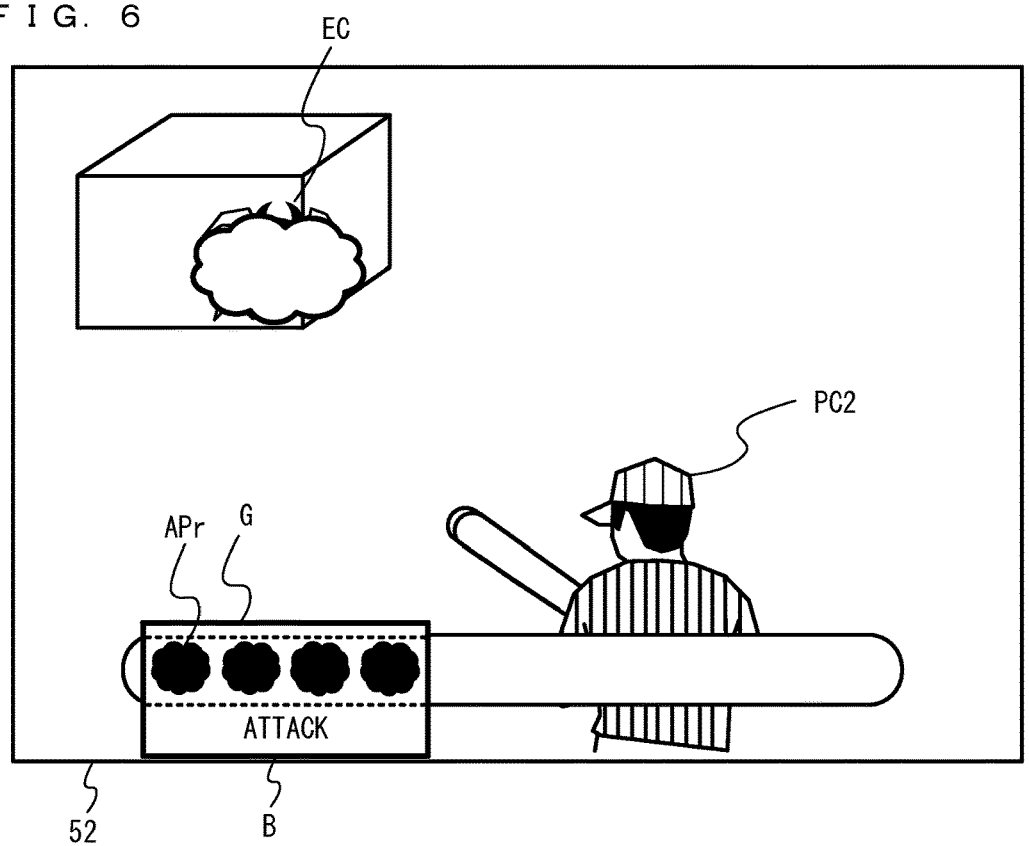
FIG. 6 is a diagram showing the non-limiting first example of the game image of the virtual world displayed on the display section 52 in the player turn.

An example of FIG. 6 shows an example of the game screen after the second player character PC2 shown in FIG. 5 has made the attack. In this case, four remaining action point images APr among the eight remaining action point images APr displayed in the action point gauge G are erased to indicate to the user that four remaining action points have been consumed by the above attack. It should be noted that in the versus game, the actions for erasing the consumption action point images APc of the operation target character to settle consumption action points are set. The above attack action is one of the actions for settling the consumption action points. Thus, in the example of FIG. 6, four remaining action point images APr indicating four remaining action points consumed by the attack are erased without being converted into consumption action point images APc. Then, two consumption action points (the two consumption action point images APc) owned by the second player character PC2 before the attack have also been erased, and four remaining action points remain. Then, in accordance with the consumption of the remaining action points, the attack consumption frame image B also moves to the position where the remaining action point images APr are continuously displayed, and four remaining action point images APr are displayed in the frame of the attack consumption frame image B.

It should be noted that as an action for settling the consumption action points, an action other than the action of attacking an enemy character may be set. As a first example, an action for settling the consumption action points may be the action of a player character being found by an enemy character in a player turn. As a second example, an action for settling the consumption action points may be the action of, if a player character has obtained a predetermined item placed in the virtual world, obtaining the item. It should be noted that as items placed in the virtual world, an item that is obtained by a player character to settle the consumption action points of the player character, and an item that does not settle the consumption action points may be mixed together.

Figure 7:
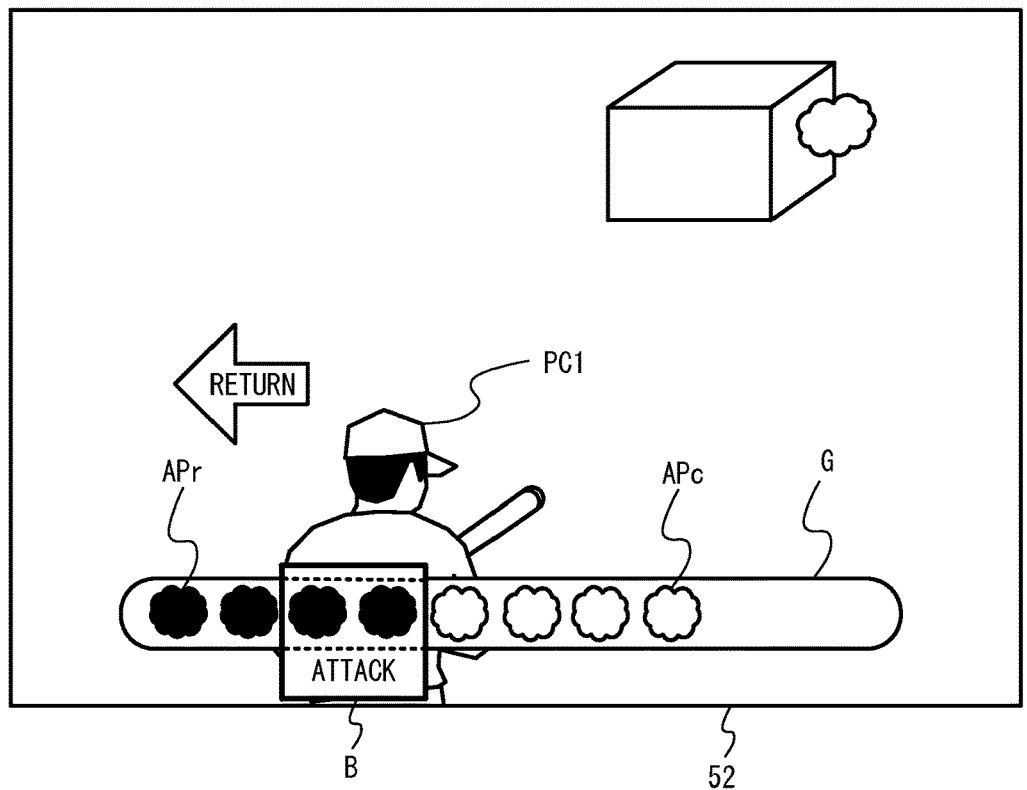
FIG. 7 is a diagram showing the non-limiting first example of the game image of the virtual world displayed on the display section 52 in the player turn.

An example of FIG. 7 shows an example of the game screen in which, after the attack of the second player character PC2 shown in FIG. 6, the operation target character has been switched to the first player character PC1 again during the same player turn. In this case, the operation target character has been changed to the first player character PC1 again, and therefore, the virtual world viewed from the virtual camera corresponding to the first player character PC1 having become the operation target is displayed on the display section 52. Then, on the game screen, an action point gauge G is displayed, which indicates action points that allow the first player character PC1, selected as the operation target character again, to perform an action during the current player turn (the same action points as the action points left at the end of the previous action opportunity). As an example, in the example of FIG. 7, in the action point gauge G, four remaining action point images APr and four consumption action point images APc are displayed, which indicate the four remaining action points and the four consumption action points owned by the first player character PC1 immediately before the operation target character has been switched to the second player character PC2. As described above, in the versus game, it is possible to set a single player character as the operation target character multiple times during the same player turn to provide a plurality of action opportunities to the single player character. Thus, it is possible to operate a single player character multiple times during the same player turn and switch the player character to be operated during the operation of the player character. Further, if the same player character is set as the operation target character again, the action points set at the end of the previous action opportunity are carried on. Thus, it is necessary to divide the set action points into respective action opportunities that allow actions. This enables a game having a high level of strategy.

Figure 8:
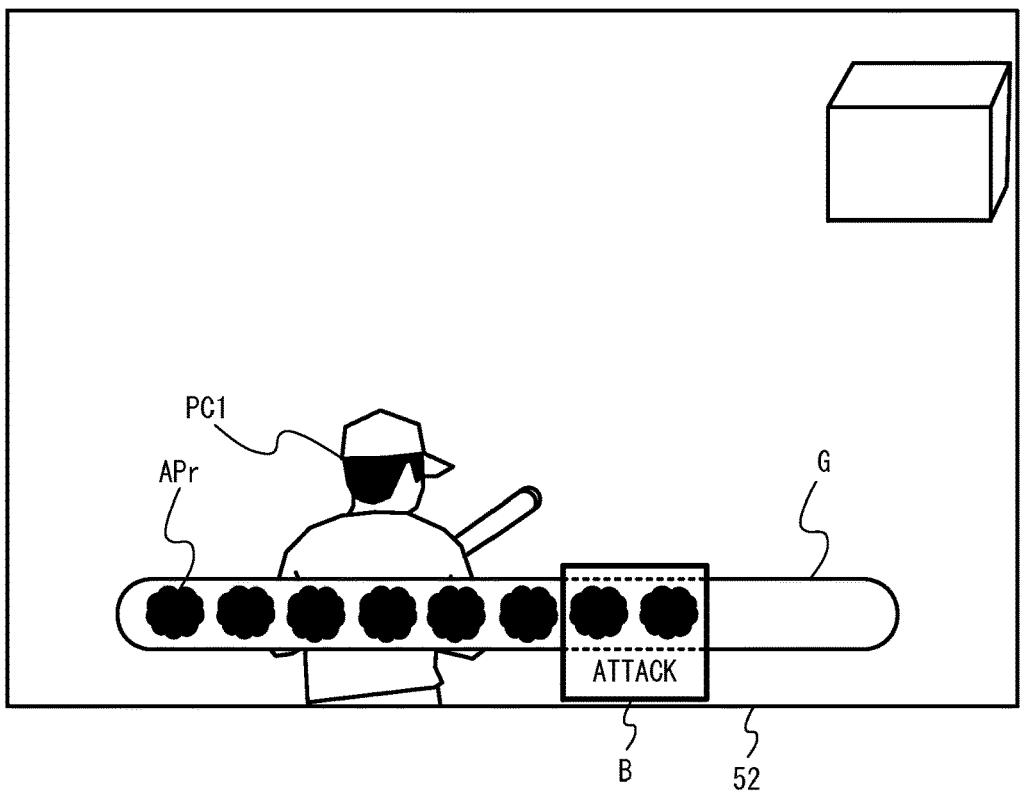
FIG. 8 is a diagram showing the non-limiting first example of the game image of the virtual world displayed on the display section 52 in the player turn.

An example of FIG. 8 shows an example of the game screen that has moved from the position of the first player character PC1 shown in FIG. 7 to the left (that is, has moved in the direction of an arrow shown in FIG. 7) at a moving distance corresponding to four remaining action points, whereby the first player character PC1 has performed the action of returning to the position where the first player character PC1 has been placed first in the previous action opportunity (i.e., the position of the first player character PC1 shown with reference to FIG. 2). In this case, the four consumption action point images APc displayed in the action point gauge G are changed and restored to four remaining action point images APr to indicate to the user that four remaining action points have been restored by the return action. With reference to FIG. 9, an example of the return action is described below.

FIG. 9 is a bird's-eye view of the virtual world showing examples of remaining action points consumed when the operation target character moves in the virtual world. For example, each square shown in FIG. 9 indicates the position where the operation target character is placed in the virtual world. An initial position square of "0" indicated in a shaded area is the position where the operation target character is placed first in the player turn. Then, the numerical value described in each square indicates remaining action points required for the operation target character to reach the square from the initial position square. In the example of FIG. 9, if the operation target character moves one square away from the initial position square, one remaining action point is consumed.

For example, if the operation target character owning four remaining action points has moved from the initial position square to a square in which "1" is described to a square in which "2" is described, the remaining action points become three when the operation target character has reached the square in which "1" is described, and the remaining action points become two when the operation target character has reached the square in which "2" is described. On the other hand, as described above, consumed remaining action points are converted into consumption action points unless an action for settling the remaining action points is performed. Thus, the consumption action points become one when the operation target character has reached the square in which "1" is described. The consumption action points become two when the operation target character has reached the square in which "2" is described. Then, if the operation target character having reached the square in which "2" is described has made the movement of returning to the square in which "1" is described (i.e., a return action), one consumption action point is restored to one remaining action point when the operation target character has returned to the square in which "1" is described. Thus, the remaining action points are restored to three, and the consumption action points return to one. As described above, in the versus game, a "return action" is performed, whereby it is possible to restore remaining action points consumed once in accordance with the content of the return action. Thus, the degree of freedom of the action of the operation target character is improved. This enables a game having a high level of strategy. For example, in the example of the operation target character owning four remaining action points, the operation target character can freely move in the range of numerical values "0" to "4" shown in FIG. 9 in the same player turn and can also move around in this range any number of times, unless an action for settling the remaining action points is performed. Further, the consumption action point images APc displayed during the movement of the operation target character can indicate, by the displayed number, the amount of movement that allows the operation target character to return to the initial position square.

An example of FIG. 10 shows an example of the game screen in which the first player character PC1 as the operation target character sets an ambush attack while owning eight remaining action points shown in FIG. 8. In the versus game, the player turn is ended in the state where remaining action points are left that allow the operation target character to attack an enemy character. This makes it possible to automatically make an ambush attack on an enemy character in a next enemy turn. In the example shown in FIG. 10, the first player character PC1 owns remaining action points that allow four attacks. Thus, it is possible to set an ambush attack that allows four automatic attacks on an enemy character in the next enemy turn. Then, the user performs a predetermined operation during the player turn, thereby ending the player turn and starting an enemy turn. Thus, it is possible to make an ambush attack during the enemy turn.

For example, as shown in FIGS. 10 and 11, a predetermined operation is performed during the player turn to set an ambush attack position in the virtual world, thereby setting an ambush range based on the ambush attack position and the operation target character. For example, an ambush range is set to a range having a predetermined angle to each of the left and right of the operation target character with respect to the ambush attack position (A° to each of the left and right of the ambush attack position in the example of FIG. 11) and also to the range where the operation target character can make an attack. Further, the line of fire of an ambush attack for making an ambush attack on an enemy character is initialized on a straight line connecting the operation target character to the ambush attack position. Then, if an enemy character has entered the ambush range set by the player character during the next enemy turn and if a predetermined condition is satisfied, the player character automatically performs the action of attacking the enemy character. Here, the range where the operation target character can make an attack is within the shooting range of a weapon with which the operation target character makes an ambush attack, and is a range except for the range of the blind spot of the operation target character created by a cover or the like in the virtual world.

FIG. 12 shows an example of a game image displayed on the display section 52 when an enemy turn has been started after the ambush attack exemplified in FIG. 10 had been set. For example, to display a virtual world image on the display section 52 at the start of the enemy turn, the virtual camera corresponding to the operation target character set last in the player turn before the enemy turn is used. Thus, in the example of FIG. 12, an image of the virtual world viewed from the virtual camera corresponding to the first player character PC1 set last as the operation target character is displayed on the display section 52 at the start of the enemy turn.

An example of FIG. 13 shows an example of the game screen in which the first player character PC1 shown in FIG. 12 is making an ambush attack. As shown in FIG. 13, if the enemy character EC has entered the ambush range during the enemy turn, the player character having set the ambush range (the first player character PC1 here) automatically makes an ambush attack on the enemy character EC. In this case, the eight remaining action points owned when an ambush attack has been set are consumed by two remaining action points used for a single ambush attack. Thus, two remaining action point images APr are erased from eight remaining action point images APr, and the six remaining action point images APr are displayed to indicate to the user that two remaining action points have been consumed by the ambush attack, and it is possible to further make ambush attacks corresponding to six remaining action points (i.e., three ambush attacks).

Here, if an enemy character having entered the ambush range during the enemy turn crosses the line of fire of an ambush attack, the ambush attack is made on the enemy character. For example, as shown in FIG. 14, the line of fire of an ambush attack initialized on the straight line connecting the operation target character to the ambush attack position when an ambush attack has been set changes its direction at a predetermined angular velocity about the player character that makes an ambush attack (changes its direction in the direction of an arrow shown in FIG. 14), toward the enemy character having entered the ambush range during the enemy turn. Then, at the time when the line of fire of an ambush attack that changes its direction about the player character crosses the enemy character having entered the ambush range, an ambush attack is made on the enemy character. Thus, if the enemy character having entered the ambush range has moved out of the ambush range before crossing the line of fire of an ambush attack, an ambush attack is not made on the enemy character.

It should be noted that an ambush attack to be automatically made by the player character may give a special effect to an enemy character subjected to the attack. Here, the special effect refers to an effect that is not obtained when a player character attacks an enemy character during a player turn. For example, an enemy character subjected to an ambush attack may not be able to perform an action in this enemy turn when the enemy character has been subjected to the attack. As an example, an enemy character subjected to an ambush attack may not be able to perform an action with a predetermined probability when the enemy character has been subjected to the attack. Further, on an enemy character subjected to an ambush attack, damage greater than an attack to which the enemy character is subjected during a player turn may be inflicted.

In addition, as shown in FIG. 15, if the direction of the line of fire of an ambush attack has changed toward the enemy character having entered the ambush range, the position of the ambush range also changes in accordance with the change in the direction of the line of fire of an ambush attack, and a next ambush attack and ambush attacks after that are made. For example, the ambush range is reset by moving the ambush range in the virtual world so as to be formed in the same angle range about the line of fire of an ambush attack that changes its direction. For example, as shown in FIG. 15, if an ambush attack has been made on the enemy character EC, the line of fire of an ambush attack moves in the direction of crossing the enemy character EC. Thus, the ambush range also moves to a position having its center in the direction of connecting the player character having made the ambush attack to the enemy character EC subjected to the ambush attack, and a next ambush attack and ambush attacks after that are set using the ambush range after the movement. It should be noted that if the enemy character having entered the ambush range has moved out of the ambush range before crossing the line of fire of an ambush attack, the direction of the line of fire of an ambush attack changes until the enemy character moves out of the ambush range. The ambush range, however, may be reset about the direction of the line of fire of an ambush attack when the enemy character has moved out of the ambush range.

In addition, during an enemy turn, if an enemy character has performed a predetermined action on a player character having set an ambush range, the position of the ambush range may change toward the enemy character. For example, if an enemy character has performed the action of attacking a player character having set an ambush range, or an enemy character has performed the action of finding a player character having set an ambush range, the direction of the line of fire of an ambush attack changes toward the enemy character. Then, the ambush range is also reset by moving the ambush range in the virtual world so as to be formed in the same angle range to the left and right with respect to the line of fire of an ambush attack that changes its direction.

As described above, at the start of an enemy turn, a virtual world image to be displayed on the display section 52 is generated using the virtual camera corresponding to the operation target character set last in the player turn before the enemy turn. Then, during the enemy turn after that, the virtual camera is switched to a virtual camera corresponding to a corresponding target character automatically set in accordance with the action of an enemy character, thereby generating a virtual world image to be displayed on the display section 52. Here, the corresponding target character is a player character to which the user should pay attention during an enemy turn, and is a player character of which, when an enemy character has performed an action in the enemy turn, the degree of association with the enemy character has become equal to or greater than a predetermined threshold, and which is most related to the enemy character. As a first example, if an enemy character moves in the virtual world in an enemy turn, a player character found by (having entered the range of field of view of) the enemy character is set as a corresponding target character. As a second example, a player character to be attacked by an enemy character in an enemy turn is set as a corresponding target character. As a third example, if an enemy character has entered an ambush range in an enemy turn, a player character having set the ambush range is set as a corresponding target character. As a fourth example, if an enemy character moves in the virtual world in an enemy turn, a player character placed within a predetermined distance from the enemy character and having come closest to the enemy character is set as a corresponding target character.

For example, an example of FIG. 16 shows an example of the game screen when the second player character PC2 has been set as a corresponding target character by being found by the enemy character EC during an enemy turn. In this case, the virtual camera for displaying a virtual world image on the display section 52 during the enemy turn is switched to a virtual camera corresponding to the second player character PC2 as the corresponding target character. As an example, a virtual camera corresponding to the newly set corresponding target character is placed at a position in front of which the corresponding target character is placed, and also a position on a straight line connecting an enemy character most related to the corresponding target character to the corresponding target character. Then, the virtual camera is set with such an orientation that the enemy character is a fixation point. As another example, a virtual camera corresponding to the newly set corresponding target character is placed within the corresponding target character and is set with such an orientation that an enemy character most related to the corresponding target character is a fixation point.

It should be noted that the position and/or the orientation of the virtual camera to be switched during an enemy turn may be changed in accordance with a user operation during the enemy turn. For example, based on the position and the orientation of a virtual camera initialized so as to correspond to the corresponding target character, the position and the orientation of the virtual camera can be changed within a predetermined range (e.g., 30° upward, downward, leftward, and rightward with respect to the corresponding target character) in accordance with a predetermined operation on the input section 51 during the enemy turn.

In addition, the virtual camera for displaying a virtual world image on the display section 52 during an enemy turn may be switched to another virtual camera by a user operation. For example, a virtual camera corresponding to the corresponding target character set as the virtual camera for displaying a virtual world image on the display section 52 may be switched to a virtual camera corresponding to another player character in accordance with a predetermined operation on the input section 51 during an enemy turn.

In addition, an ambush range as described above may be configured to be set also by an enemy character. In this case, in an enemy turn, the enemy turn is ended in the state where remaining action points are left that allow an enemy character to attack a player character, thereby setting an ambush range where an ambush attack is automatically made on a player character in a player turn to be executed next. Then, in the player turn, if a player character has entered the ambush range set by the enemy character, at the time when the player character crosses the line of fire of an ambush attack of the enemy character, an ambush attack is made on the player character. Further, in the player turn, if a player character has entered the ambush range set by the enemy character and has moved out of the ambush range before crossing the line of fire of an ambush attack of the enemy character, an ambush attack is not made on the player character. Further, in the player turn, if an ambush attack has been made on a player character or a player character has moved out of the ambush range before being subjected to an ambush attack, the ambush range set by the enemy character is also reset by moving the ambush range similarly to an ambush range set by a player character. Further, in the player turn, in response to the fact that an attack has been made on an enemy character having set an ambush range, or a player character has found the enemy character, the ambush range set by the enemy character may be reset by moving the ambush range.

In addition, player characters may be configured to hand over remaining action points to each other. For example, during a player turn, if the operation target character owns remaining action points that can be handed over, the user operates the input section 51, thereby specifying the number of remaining action points to be handed over and a player character as the handover destination. In accordance with this handover operation, remaining action points to be handed over are consumed by the above number of points in the operation target character as the handover source, and remaining action points increase by the above number of points in the player character as the handover destination. In this case, the action of handing over remaining action points may be an action for settling the consumption action points. That is, if remaining action points have been handed over, consumption action point images APc of the operation target character as the handover source are erased to settle the consumption action points, and simultaneously, consumption action point images APc of the player character as the handover destination are also erased to settle the consumption action points.

In addition, in the above exemplary embodiment, the operation target character ends a player turn in the state where remaining action points are left that allow the operation target character to attack an enemy character, whereby it is possible to automatically make an ambush attack on an enemy character in accordance with the number of remaining action points in a next enemy turn. That is, a player character ends a player turn in the state where remaining action points are left, whereby the player character can perform an automatic action in an opponent turn and can perform the automatic action the number of times corresponding to the number of remaining action points left at the end of the player turn. It should be noted that it goes without saying that the action to be automatically performed by the player character in the opponent turn does not need to be an ambush attack action on an enemy character. For example, even in a versus game with an enemy character, the action to be automatically performed by the player character in the enemy turn may be the action of counterattacking the enemy character when the player character has been attacked by the enemy character in the enemy turn, the action of defending itself when the player character has been attacked by the enemy character in the enemy turn, the action of escaping when the player character has been attacked by the enemy character in the enemy turn, the action of finding the enemy character in the enemy turn, the action of recovering the life parameter of the player character itself in the enemy turn, or the like. Further, in the case of a game other than a versus game, the action to be automatically performed by the player character in the opponent turn may be the action of conforming to the action of an opponent character in the opponent turn, the action of going against the action of an opponent character in the opponent turn, the action of disturbing the action of an opponent character in the opponent turn, the action of giving a disadvantage to an opponent character in the opponent turn, or the like.

Next, a detailed description is given of information processing (e.g., game processing) performed by the information processing apparatus 5. It should be noted that the following description of the information processing uses an example where game processing for performing the turn-based versus game described above is performed. First, with reference to FIG. 17, main data used in the information processing is described. It should be noted that FIG. 17 is a diagram showing examples of main data and programs stored in the storage section 56 of the information processing apparatus 5.

Figure 17:
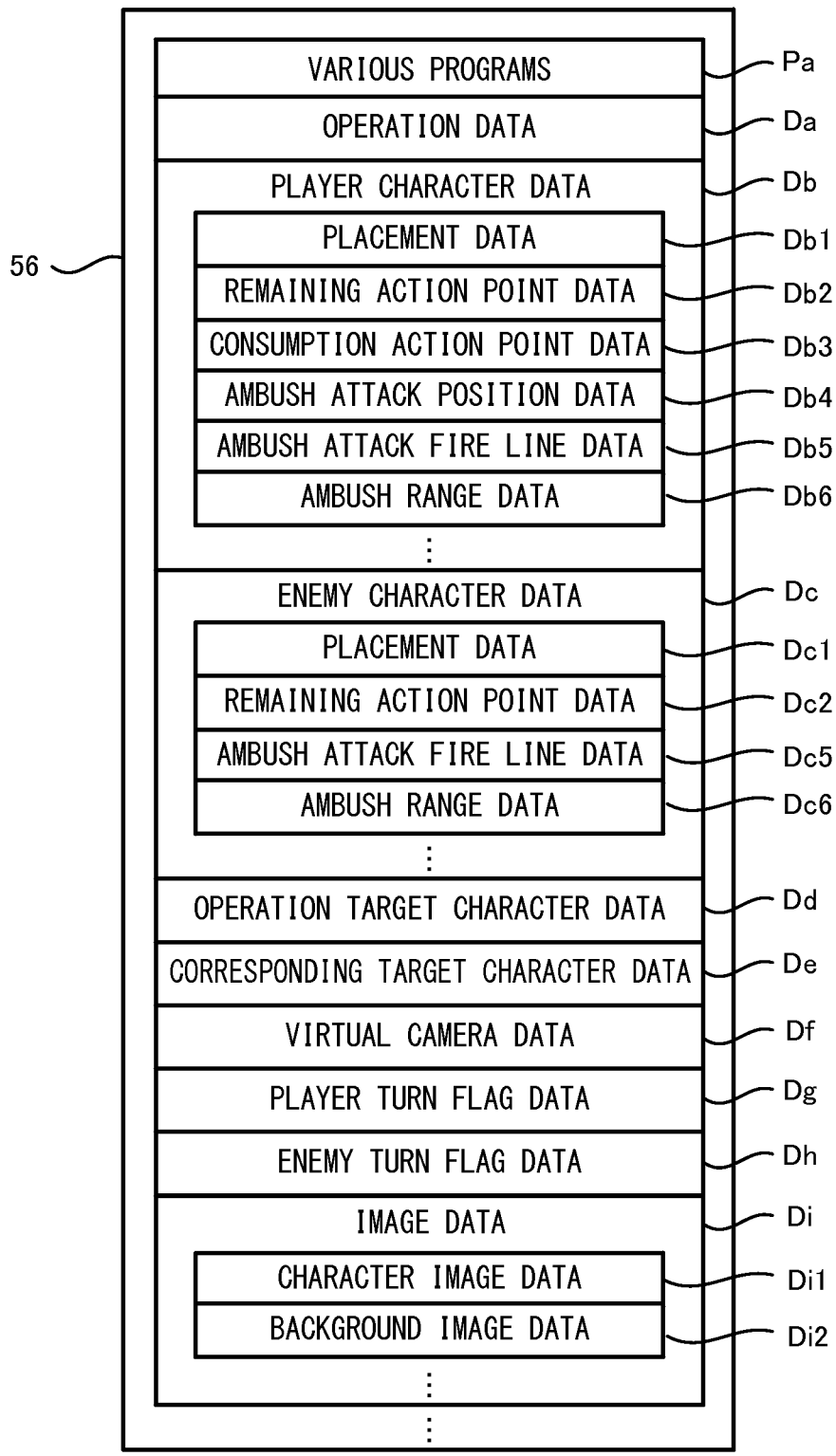
FIG. 17 is a diagram showing non-limiting examples of main data and programs stored in a storage section 56 of the information processing apparatus 5.

As shown in FIG. 17, the following are stored in the data storage area of the storage section 56: operation data Da; player character data Db; enemy character data Dc; operation target character data Dd; corresponding target character data De; virtual camera Df; player turn flag data Dg; enemy turn flag data Dh; image data Di; and the like. It should be noted that the storage section 56 may store, as well as the data shown in FIG. 17, data and the like necessary for the information processing (the game processing), such as other pieces of data used in a program to be executed. Further, in the program storage area of the storage section 56, various programs Pa included in an information processing program (a game program) are stored.

The operation data Da has stored therein a series of pieces of operation information (operation data) acquired from the input section 51 and is updated to the latest operation data.

The player character data Db is data regarding each player character placed in a virtual world. For example, the player character data Db stores placement data Db1, remaining action point data Db2, consumption action point data Db3, ambush attack position data Db4, ambush attack fire line data Db5, ambush range data Db6, and the like for each player character. The placement data Db1 is data representing the position, the orientation (the direction), the life (a parameter representing the physical strength, the endurance, the vital force, or the like of the player character), and the like of the player character in the virtual world. The remaining action point data Db2 is data representing the number of remaining action points owned by the player character. The consumption action point data Db3 is data representing the number of consumption action points owned by the player character. The ambush attack position data Db4 is data representing an ambush attack position in the virtual world set by the player character. The ambush attack fire line data Db5 is data representing the line of fire of an ambush attack in the virtual world set by the player character. The ambush range data Db6 is data representing an ambush range in the virtual world set by the player character.

The enemy character data Dc is data regarding each enemy character placed in the virtual world. For example, the enemy character data Dc stores placement data Dc1, remaining action point data Dc2, ambush attack fire line data Dc5, ambush range data Dc6, and the like for each enemy character. The placement data Dc1 is data representing the position, the orientation (the direction), the life (a parameter representing the physical strength, the endurance, the vital force, or the like of the enemy character), and the like of the enemy character in the virtual world. The remaining action point data Dc2 is data representing the number of remaining action points owned by the enemy character. The ambush attack fire line data Dc5 is data representing the line of fire of an ambush attack in the virtual world set by the enemy character. The ambush range data Dc6 is data representing an ambush range in the virtual world set by the enemy character.

The operation target character data Dd is data representing a player character set as an operation target character in a player turn. The corresponding target character data De is data representing a player character set as a corresponding target character in an enemy turn.

The virtual camera Df is data representing the position, the orientation, the viewing angle, and the like of a virtual camera set so as to correspond to each player character and includes data for distinguishing a virtual camera currently used to display a virtual world image on the display section 52.

The player turn flag data Dg is data representing a player turn flag indicating whether or not it is during a player turn. If it is during a player turn, the player turn flag is set to on. The enemy turn flag data Dh is data representing an enemy turn flag indicating whether or not it is during an enemy turn. If it is during an enemy turn, the enemy turn flag is set to on.

The image data Di includes character image data Di1, background image data Di2, and the like. The character image data Di1 is data for placing each character in the virtual world to generate a game image. The background image data Di2 is data for placing other objects and a background in the virtual world to generate a game image.

Figure 18:
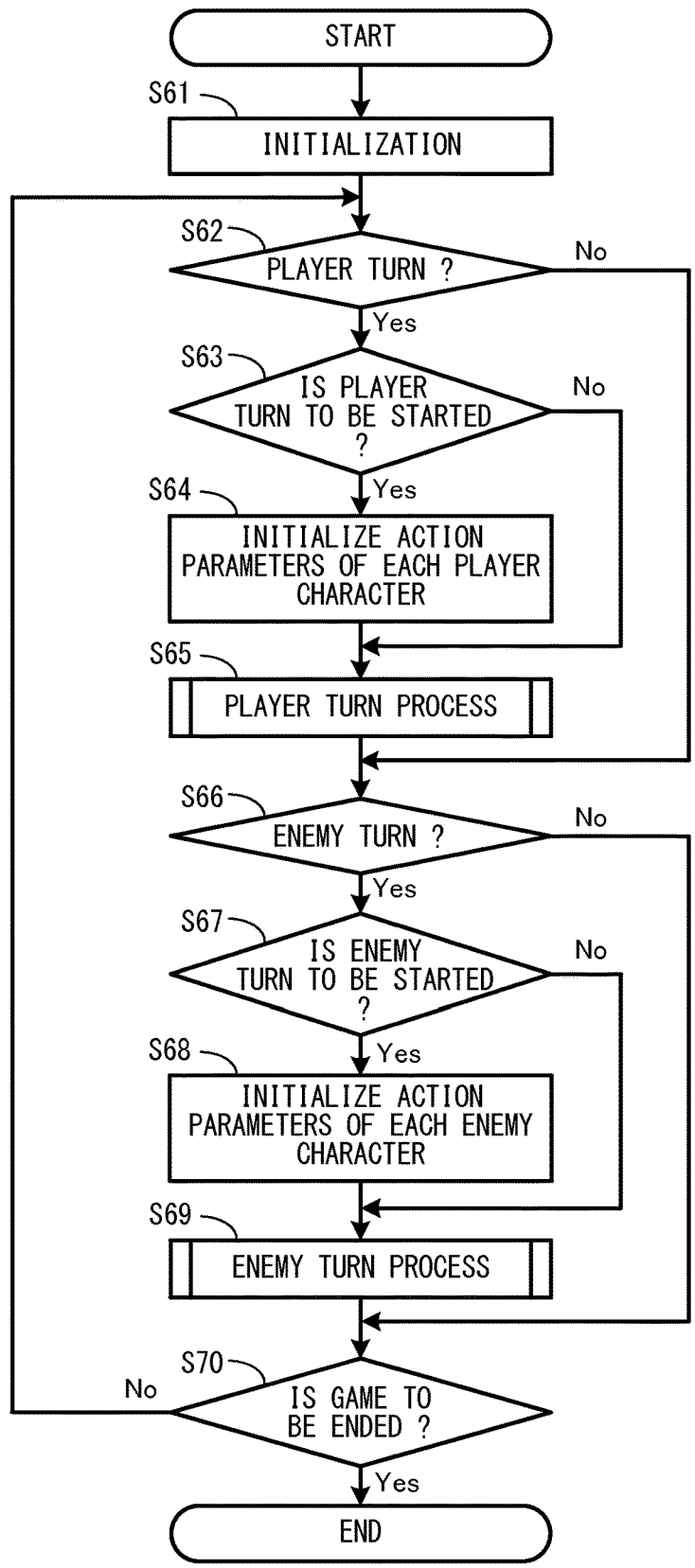
FIG. 18 is a flow chart showing a non-limiting example of information processing performed by the information processing apparatus 5.
Figure 19:
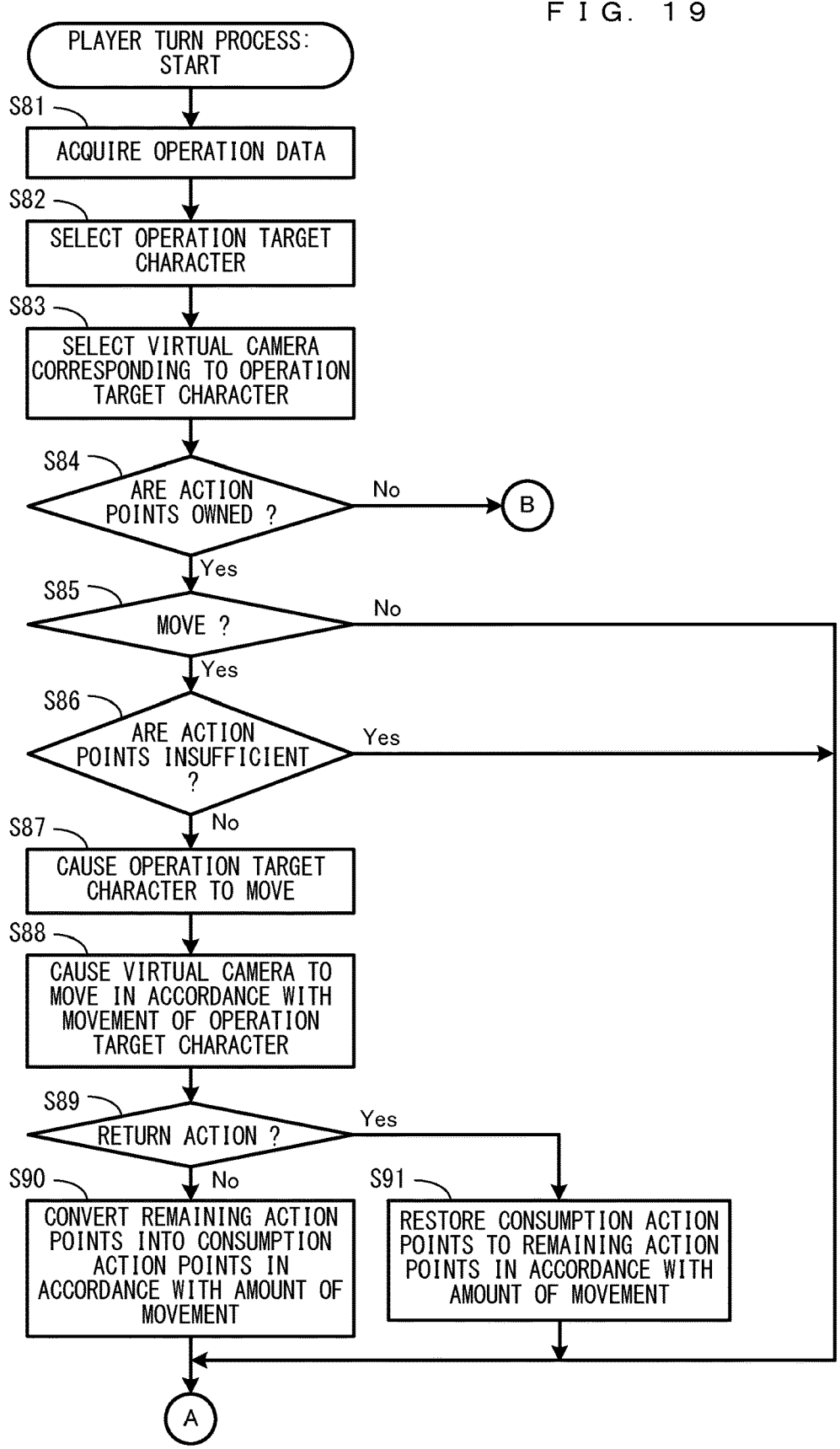
FIG. 19 is a subroutine showing a non-limiting example of the early period of a player turn process of step 65 in FIG. 18.
Figure 20:
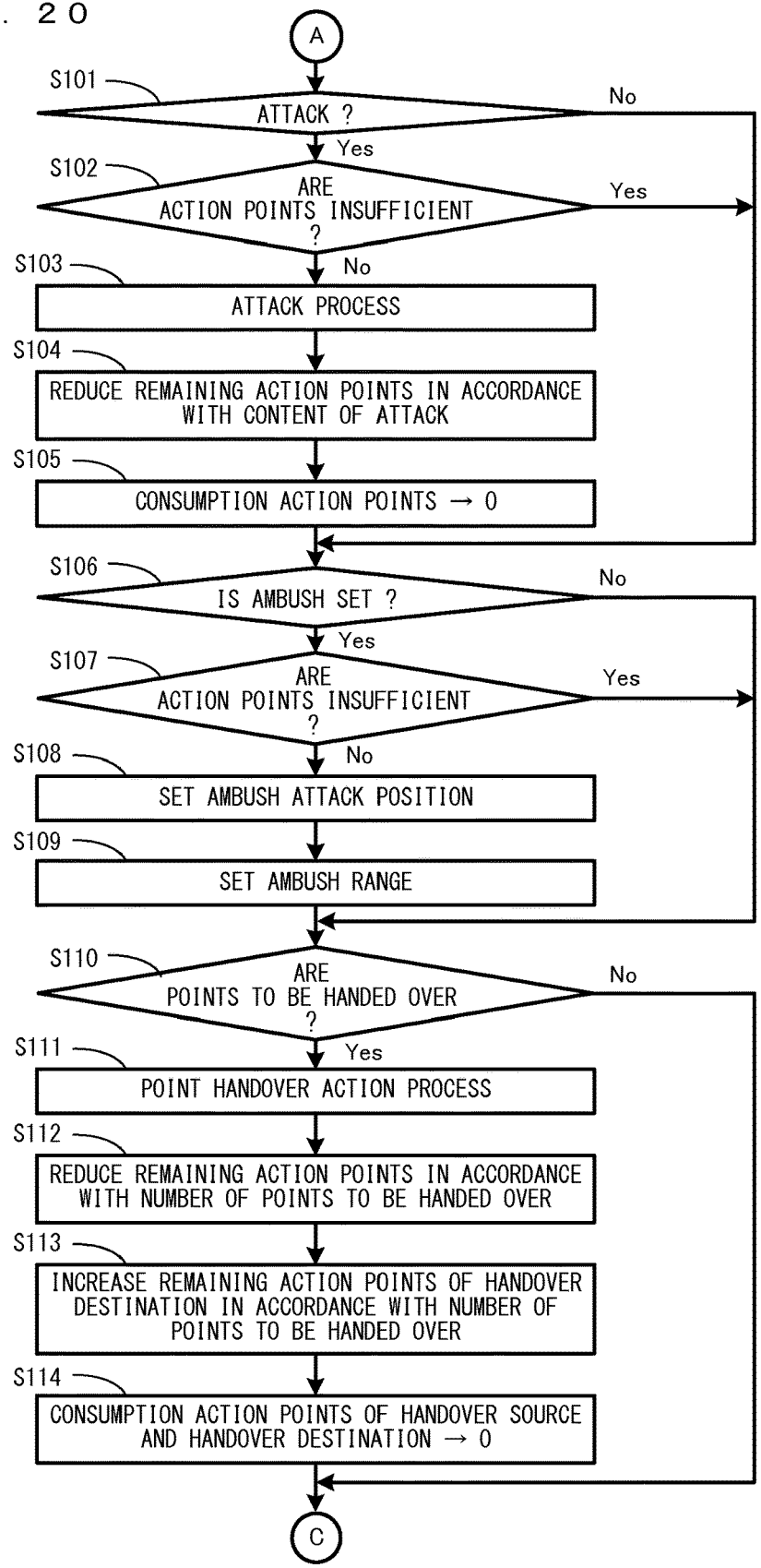
FIG. 20 is a subroutine showing a non-limiting example of the middle period of the player turn process of step 65 in FIG. 18.
Figure 21:
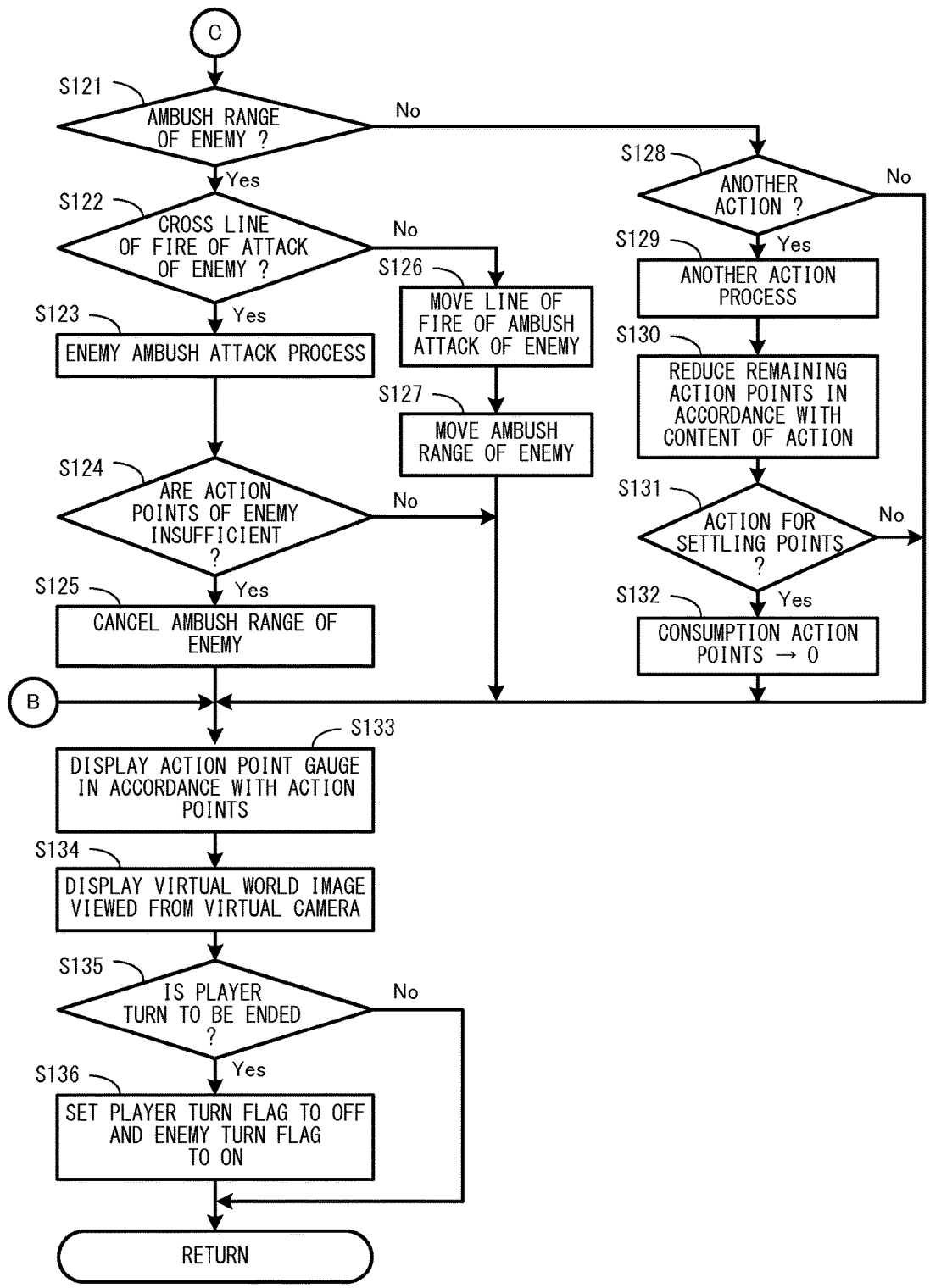
FIG. 21 is a subroutine showing a non-limiting example of the late period of the player turn process of step 65 in FIG. 18.
Figure 22:
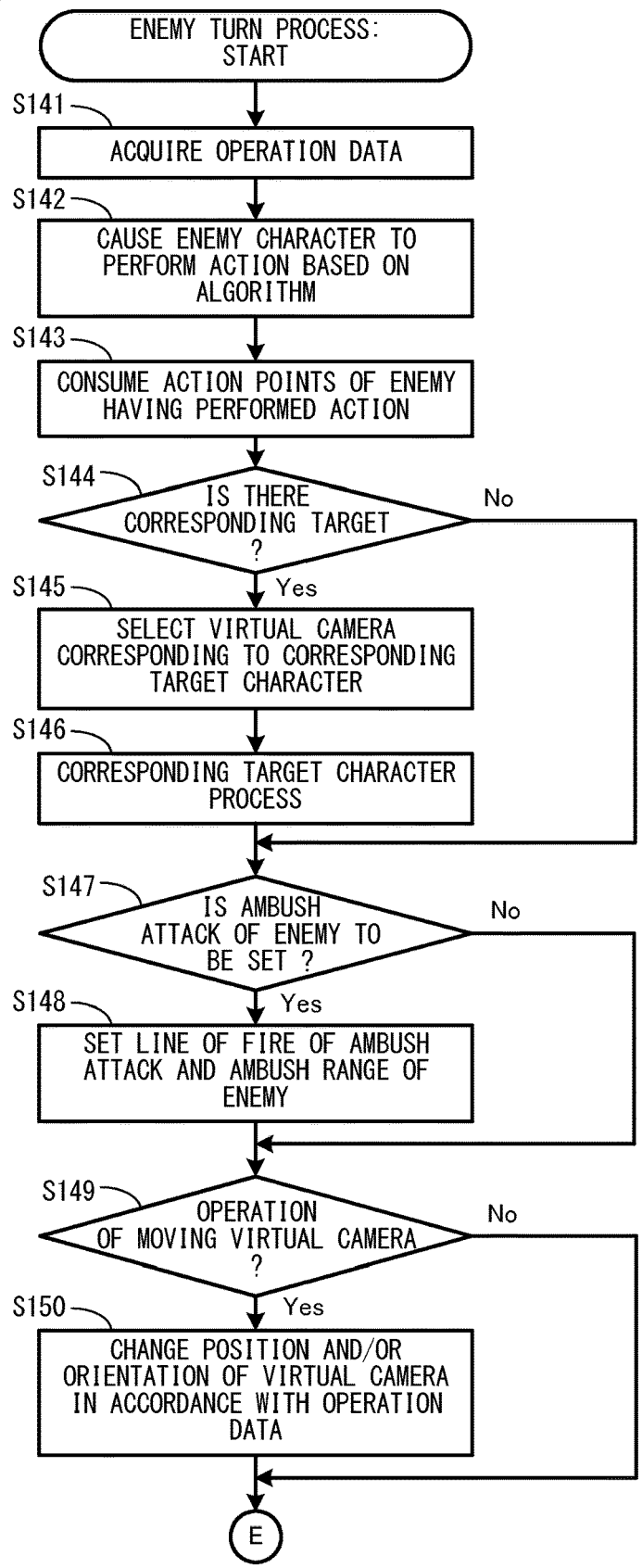
FIG. 22 is a subroutine showing a non-limiting example of the first half of an enemy turn process of step 69 in FIG. 18.
Figure 23:
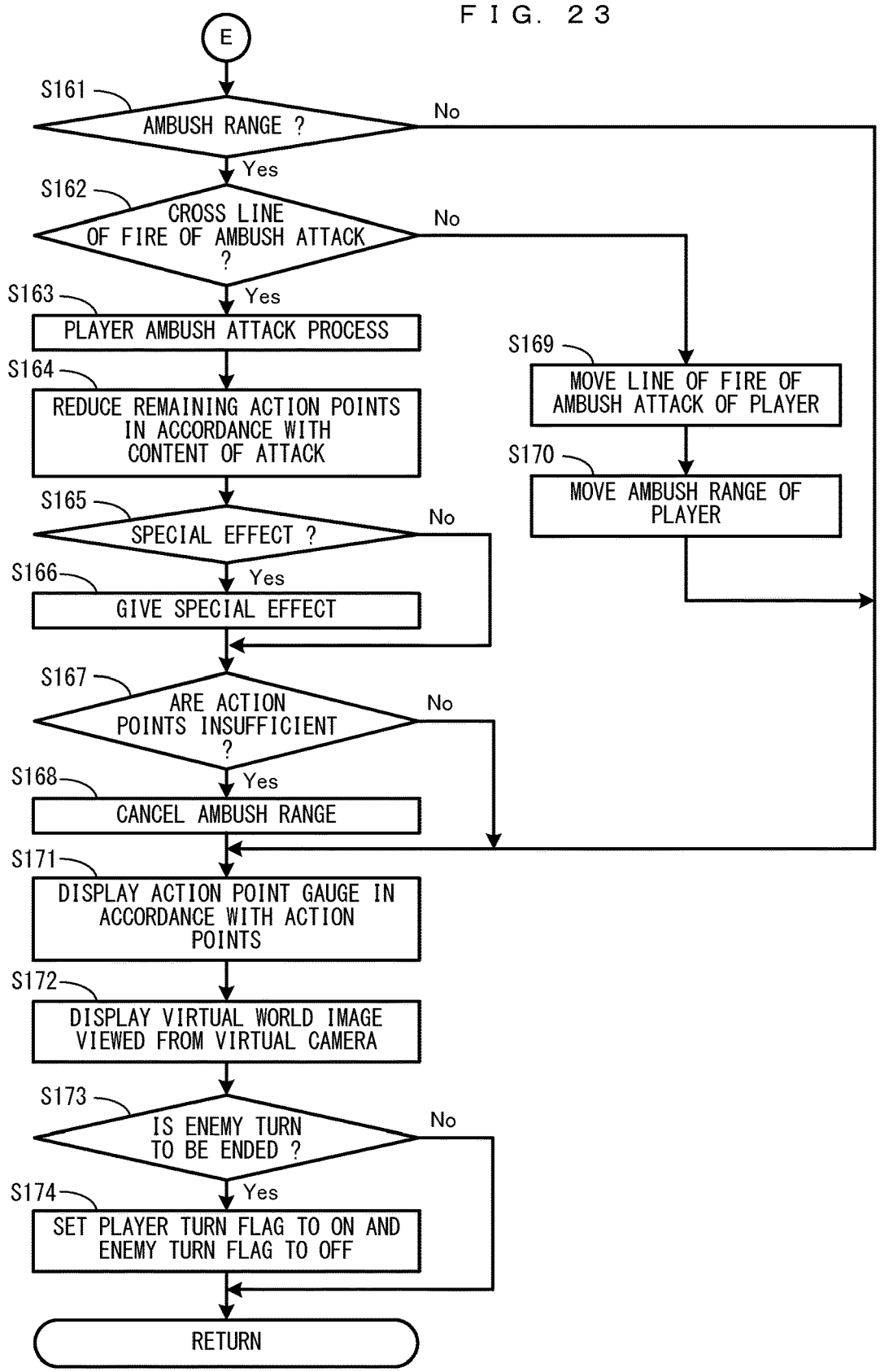
FIG. 23 is a subroutine showing a non-limiting example of the second half of the enemy turn process of step 69 in FIG. 18.

Next, with reference to FIGS. 18 to 23, detailed descriptions are given of the information processing (the game processing) performed by the information processing apparatus 5. It should be noted that FIG. 18 is a flow chart showing an example of the information processing performed by the information processing apparatus 5. FIG. 19 is a subroutine showing an example of the early period of a player turn process of step 65 in FIG. 18. FIG. 20 is a subroutine showing an example of the middle period of the player turn process of step 65 in FIG. 18. FIG. 21 is a subroutine showing an example of the late period of the player turn process of step 65 in FIG. 18. FIG. 22 is a subroutine showing an example of the first half of an enemy turn process of step 69 in FIG. 18. FIG. 23 is a subroutine showing an example of the second half of the enemy turn process of step 69 in FIG. 18. Here, in the flow charts shown in FIGS. 18 to 23, descriptions are given mainly of, in the information processing performed by the information processing apparatus 5, game processing for performing the above versus game. Detailed descriptions of other processes not directly related to these processes are omitted.

The control section 55 initializes the storage section 32 and the like and loads the information processing program (the game program) stored in the program storage section 57 into the storage section 56. Then, the control section 55 starts the execution of the information processing program. The flow charts shown in FIGS. 18 to 23 are flow charts showing the processing performed after the above processes are completed.

It should be noted that the processes of all the steps in the flow charts shown in FIGS. 18 to 23 are merely illustrative. Thus, the processing order of the steps may be changed, or another process may be performed in addition to and/or instead of the processes of all the steps, so long as similar results are obtained. Further, in the exemplary embodiment, descriptions are given on the assumption that the CPU of the control section 55 performs the processes of all the steps in the flow charts. Alternatively, a processor or a dedicated circuit other than the CPU may perform the processes of some or all of the steps in the flow charts.

Referring to FIG. 18, the control section 55 performs an initialization process (step 61) and advances the processing to the next step. For example, the control section 55 forms a virtual field used in the versus game, places a plurality of player characters and a plurality of characters on the virtual field to construct a virtual world to be displayed on the display section 52, and initializes each parameter used in the game processing, thereby updating each piece of data stored in the storage section 56. For example, the control section 55 places a virtual camera corresponding to each player character at an initial position and with an initial orientation. Further, the control section 55 initializes and sets action points owned by each character to 0, and brings the settings regarding an ambush attack and the settings of a corresponding target character into unset states. Further, the control section 55 selects one player character from among the plurality of player characters based on a predetermined rule and initializes the player character as an operation target character. Then, in accordance with a turn to be executed first (e.g., a player turn), the control section 55 sets the turn flags (for example, sets the player turn flag to on and sets the enemy turn flag to off).

Next, the control section 55 determines whether or not the current moment is during a player turn (step 62). For example, if the player turn flag indicated by the player turn flag data Dg is set to on, the control section 55 determines that the current moment is during a player turn. Then, if the current moment is during a player turn, the control section 55 advances the processing to step 63. If, on the other hand, the current moment is not during a player turn, the control section 55 advances the processing to step 66.

In step 63, the control section 55 determines whether or not the current moment is the time to start a player turn. For example, if the above step 63 is performed immediately after the player turn flag has been set to on, the control section 55 determines that the current moment is the time to start a player turn. Then, if the current moment is the time to start a player turn, the control section 55 advances the processing to step 64. If, on the other hand, the current moment is not the time to start a player turn, the control section 55 advances the processing to step 65.

In step 64, the control section 55 initializes the action parameters of each player character and advances the processing to step 65. For example, the control section 55 initializes the remaining action points of each player character to the maximum number of points set in advance for the player character, thereby updating the remaining action point data Db2. Further, the control section 55 initializes the consumption action points of each player character to 0, thereby updating the consumption action point data Db3. Further, the control section 55 sets the ambush attack position, the line of fire of an ambush attack, and the ambush range that are set by each player character to unset (canceled) states, thereby updating the ambush attack position data Db4, the ambush attack fire line data Db5, and the ambush range data Db6.

In step 65, the control section 55 performs a player turn process and advances the processing to the next step. It should be noted that the player turn process performed in the above step 65 will be described later.

Next, the control section 55 determines whether or not the current moment is during an enemy turn (step 66). For example, if the enemy turn flag indicated by the enemy turn flag data Dh is set to on, the control section 55 determines that the current moment is during an enemy turn. Then, if the current moment is during an enemy turn, the control section 55 advances the processing to step 67. If, on the other hand, the current moment is not during an enemy turn, the control section 55 advances the processing to step 70.

In step 67, the control section 55 determines whether or not the current moment is the time to start an enemy turn. For example, if the above step 67 is performed immediately after the enemy turn flag has been set to on, the control section 55 determines that the current moment is the time to start an enemy turn. Then, if the current moment is the time to start an enemy turn, the control section 55 advances the processing to step 68. If, on the other hand, the current moment is not the time to start an enemy turn, the control section 55 advances the processing to step 69.

In step 68, the control section 55 initializes the action parameters of each enemy character and advances the processing to step 69. For example, the control section 55 initializes the remaining action points of each enemy character to the maximum number of points set in advance for the enemy character, thereby updating the remaining action point data Dc2. Further, the control section 55 sets the line of fire of an ambush attack and the ambush range that are set by each enemy character to unset (canceled) states, thereby updating the ambush attack fire line data Dc5 and the ambush range data Dc6.

In step 69, the control section 55 performs an enemy turn process and advances the processing to the next step. It should be noted that the enemy turn process performed in the above step 69 will be described later.

Next, the control section 55 determines whether or not the game is to be ended (step 70). In the above step 70, examples of conditions for ending the game include: the fact that the result of the above game has been settled; and the fact that the user has performed the operation of ending the game. If the game is not to be ended, the control section 55 returns to the above step 62 and repeats the process thereof. If the game is to be ended, the control section 55 ends the processing of the flow chart. Thereafter, the control section 55 repeatedly performs the series of processes of steps 62 to 70 until it is determined in step 70 that the game is to be ended.

With reference to FIG. 19, a description is given of the player turn process performed in the above step 65.

Referring to FIG. 19, the control section 55 acquires operation data from the input section 51, thereby updating the operation data Da (step 81), and advances the processing to the next step.

Next, in accordance with the operation data acquired in the above step 81, the control section 55 selects the operation target character to be operated in the player turn (step 82) and advances the processing to the next step. For example, if the operation data acquired in the above step 81 indicates the operation of setting the operation target character, the control section 55 selects the operation target character from among the plurality of player characters in accordance with the operation and updates the operation target character data Dd using data representing the player character selected as the operation target character. Further, if the operation data acquired in the above step 81 does not indicate the operation of setting the operation target character, the control section 55 maintains the operation target character indicated by the operation target character data Dd and advances the processing to the next step.

Next, the control section 55 selects a virtual camera corresponding to the operation target character for drawing (step 83) and advances the processing to the next step. For example, the control section 55 sets, as a virtual camera used for displaying a virtual world image on the display section 52, a virtual camera set so as to correspond to the operation target character indicated by the operation target character data Dd, thereby updating the virtual camera data Df for distinguishing the set virtual camera.

Next, the control section 55 determines whether or not the player character set as the operation target character owns remaining action points (step 84). For example, if the remaining action points indicated by the remaining action point data Db2 of the player character set as the operation target character are 0, the control section 55 determines that the player character does not own remaining action points. Then, if the operation target character owns remaining action points, the control section 55 advances the processing to step 85. Then, if, on the other hand, the operation target character does not own remaining action points, the control section 55 advances the processing to step 133 (see FIG. 21).

In step 85, the control section 55 determines whether or not to cause the operation target character to move in the virtual world. For example, if the operation data acquired in the above step 81 indicates the operation of causing the operation target character to move, the control section 55 makes an affirmative determination in the above step 85. Then, if the operation target character is to be caused to move, the control section 55 advances the processing to step 86. If, on the other hand, the operation target character is not to be caused to move, the control section 55 advances the processing to step 101 (see FIG. 20).

In step 86, the control section 55 determines whether or not the player character set as the operation target character owns remaining action points required for the movement. For example, if the remaining action points indicated by the remaining action point data Db2 of the player character set as the operation target character are less than the number of points required for the movement, the control section 55 determines that the player character does not own remaining action points required for the movement. Then, if the operation target character owns remaining action points required for the movement, the control section 55 advances the processing to step 87. If, on the other hand, the operation target character does not own remaining action points required for the movement, the control section 55 advances the processing to step 101 (see FIG. 20).

In step 87, in accordance with the operation data acquired in the above step 81, the control section 55 causes the operation target character to move in the virtual world and advances the processing to the next step. For example, in accordance with the operation data, the control section 55 sets the moving direction and the moving velocity of the operation target character in the virtual world. Then, based on the above moving direction and moving velocity, the control section 55 sets the action of the player character moving from the position in the virtual world indicated by the placement data Db1 of the player character set as the operation target character and updates the placement data Db1 using the position after the movement and the orientation after the movement.

Next, in accordance with the movement of the operation target character, the control section 55 causes the virtual camera corresponding to the operation target character to move (step 88) and advances the processing to the next step. For example, based on the position, after the movement, and the orientation, after the movement, of the operation target character that have been set in the above step 87, the control section 55 sets the position and the orientation of the virtual camera set so as to correspond to the operation target character and updates data of the virtual camera related to the operation target character in the virtual camera data Df, using the set position and orientation of the virtual camera.

Next, the control section 55 determines whether or not the movement action of the operation target character performed in the above step 87 is a "return action" (step 89). For example, as described above with reference to FIGS. 7 to 9, a "return action" is set in the above versus game. If the movement action of the operation target character performed in the above step 87 corresponds to this "return action", the control section 55 makes an affirmative determination in the above step 89. It should be noted that if the consumption action points indicated by the consumption action point data Db3 of the player character set as the operation target character are 0, the control section 55 makes a negative determination in the above step 89. Then, if the movement action of the operation target character performed in the above step 87 is not a "return action", the control section 55 advances the processing to step 90. If, on the other hand, the movement action of the operation target character performed in the above step 87 is a "return action", the control section 55 advances the processing to step 91.

In step 90, the control section 55 converts remaining action points into consumption action points by the number of points corresponding to the amount of movement of the movement action of the operation target character performed in the above step 87 and advances the processing to step 101 (see FIG. 20). For example, if the number of points to be consumed in accordance with the amount of movement of the movement action of the operation target character performed in the above step 87 is "1", the control section 55 subtracts 1 from the remaining action points indicated by the remaining action point data Db2 of the player character set as the operation target character, thereby updating the remaining action point data Db2, and adds 1 to the consumption action points indicated by the consumption action point data Db3 of the player character, thereby updating the consumption action point data Db3. It should be noted that the case is considered where, if the player character set as the operation target character is found by an enemy character during movement, the remaining action points of the player character are settled. For the player character found by an enemy character as a result of the movement in the above step 90, only remaining action points may be consumed in accordance with the movement, and consumption action points may be set to 0, thereby updating the remaining action point data Db2 and the consumption action point data Db3 of the player character.

On the other hand, in step 91, the control section 55 restores consumption action points to remaining action points by the number of points corresponding to the amount of movement of the movement action of the operation target character performed in the above step 87 and advances the processing to step 101 (see FIG. 20). For example, if the number of points to be restored in accordance with the amount of movement of the movement action of the operation target character performed in the above step 87 is "1", the control section 55 subtracts 1 from the consumption action points indicated by the consumption action point data Db3 of the player character set as the operation target character, thereby updating the consumption action point data Db3, and adds 1 to the remaining action points indicated by the remaining action point data Db2 of the player character, thereby updating the remaining action point data Db2.

Referring next to FIG. 20, in step 101, the control section 55 determines whether or not the operation target character is to attack an enemy character in the virtual world. For example, if the operation data acquired in the above step 81 indicates the attack operation of the operation target character, the control section 55 makes an affirmative determination in the above step 101. Then, if the operation target character is to make an attack, the control section 55 advances the processing to step 102. If, on the other hand, the operation target character is not to make an attack, the control section 55 advances the processing to step 106.

In step 102, the control section 55 determines whether or not the player character set as the operation target character owns remaining action points required for the attack. For example, if the remaining action points indicated by the remaining action point data Db2 of the player character set as the operation target character are less than the number of points required for the player character to make an attack, the control section 55 determines that the player character does not own remaining action points required for the attack. Then, if the operation target character owns remaining action points required for the attack, the control section 55 advances the processing to step 103. If, on the other hand, the operation target character does not own remaining action points required for the attack, the control section 55 advances the processing to step 106.

In step 103, in accordance with the operation data acquired in the above step 81, the control section 55 performs the process of causing the operation target character to attack an enemy character in the virtual world and advances the processing to the next step. For example, in accordance with the operation data, the control section 55 sets an enemy character to be attacked by the operation target character in the virtual world and damage to be inflicted on the enemy character when the attack is successful. Then, in accordance with a predetermined algorithm, the control section 55 determines whether or not the attack is successful, then sets the action of the player character making the attack based on the orientation in the virtual world indicated by the placement data Db1 of the player character set as the operation target character, and the action of the enemy character subjected to the attack based on the orientation of the enemy character indicated by the placement data Dc1, and updates the placement data Db1 and the placement data Dc1 using the orientations resulting from the set actions. Further, based on the determined success or failure of the attack and the set damage to be inflicted on the enemy character, the control section 55 changes the parameter indicating the life of the enemy character indicated by the placement data Dc1, thereby updating the placement data Dc1.

It should be noted that if the attacked enemy character has set an ambush range, the position of the ambush range may be changed toward the player character having made the attack. In this case, the direction of the line of fire of an ambush attack of the enemy is changed toward the player character having attacked the enemy character, at a predetermined angular velocity about the position of the enemy character, thereby updating the ambush attack fire line data Dc5 of the enemy character. Then, the ambush range of the enemy is moved to a position having its center on the line of fire of an ambush attack of the enemy after the movement, and the ambush range data Dc6 of the enemy character is updated using the position of the ambush range after the movement.

Next, the control section 55 reduces the remaining action points by the number of points corresponding to the content of the attack in the attack action of the operation target character performed in the above step 103 (step 104) and advances the processing to the next step. For example, if the number of points to be consumed in accordance with the content of the attack in the attack action of the operation target character performed in the above step 103 is "2", the control section 55 subtracts 2 from the remaining action points indicated by the remaining action point data Db2 of the player character set as the operation target character, thereby updating the remaining action point data Db2.

Next, the control section 55 sets the consumption action points of the operation target character to 0 (step 105) and advances the processing to step 106. For example, the control section 55 sets the consumption action points indicated by the consumption action point data Db3 of the player character set as the operation target character, to 0, thereby updating the consumption action point data Db3. If the player character set as the operation target character has attacked the enemy character as a result of the processes of steps 104 and 105, the remaining action points decrease in accordance with the content of the attack, and simultaneously, the consumption action points become 0, thereby settling the remaining action points of the player character.

In step 106, the control section 55 determines whether or not the operation target character is to make an ambush attack on an enemy character in the virtual world. For example, if the operation data acquired in the above step 81 indicates the operation of setting the ambush attack of the operation target character, the control section 55 makes an affirmative determination in the above step 106. Then, if the operation target character is to make an ambush attack, the control section 55 advances the processing to step 107. If, on the other hand, the operation target character is not to make an ambush attack, the control section 55 advances the processing to step 110.

In step 107, the control section 55 determines whether or not the player character set as the operation target character owns remaining action points required for the ambush attack. For example, if the remaining action points indicated by the remaining action point data Db2 of the player character set as the operation target character are less than the number of points required for the player character to make an ambush attack, the control section 55 determines that the player character does not own remaining action points required for the ambush attack. Then, if the operation target character owns remaining action points required for the ambush attack, the control section 55 advances the processing to step 108. If, on the other hand, the operation target character does not own remaining action points required for the ambush attack, the control section 55 advances the processing to step 110.

In step 108, in accordance with the operation data acquired in the above step 81, the control section 55 performs the process of setting an ambush attack position in the virtual world and advances the processing to the next step. For example, in accordance with the operation data, the control section 55 sets an ambush attack position that is the center of an ambush range where the operation target character makes an ambush attack in the virtual world (see FIGS. 10 and 11), and sets the ambush attack position data Db4 of the player character set as the operation target character, using data (e.g., coordinate data) representing the set ambush attack position in the virtual world.

Next, based on the ambush attack position set in the above step 108, the control section 55 performs the process of setting an ambush range in the virtual world and advances the processing to step 110. For example, the control section 55 sets as an ambush range a range having a predetermined angle to each of the left and right of the operation target character with respect to the ambush attack position and also a range except for the blind spot of the operation target character (see FIGS. 10 and 11) and sets the ambush range data Db6 of the player character set as the operation target character, using data representing the set ambush range in the virtual world. Further, the control section 55 sets the line of fire of an ambush attack (see FIGS. 10 and 11) in the direction from the operation target character to the ambush attack position in the virtual world and sets the ambush attack fire line data Db5 of the player character set as the operation target character, using data representing the set line of fire of an ambush attack in the virtual world.

In step 110, the control section 55 determines whether or not the operation target character is to perform the action of handing over remaining action points to another one of the player characters in the virtual world. For example, if the operation data acquired in the above step 81 indicates that the handover action is to be performed, the control section 55 makes an affirmative determination in the above step 110. Then, if the operation target character is to perform the action of handing over remaining action points, the control section 55 advances the processing to step 111. If, on the other hand, the operation target character is not to perform the action of handing over remaining action points, the control section 55 advances the processing to step 121 (see FIG. 21).

In step 111, in accordance with the operation data acquired in the above step 81, the control section 55 performs the process for the action of the operation target character handing over remaining action points to another one of the player characters and advances the processing to the next step. For example, in accordance with the operation data, the control section 55 sets one of the player characters as the other party to which remaining action points are to be handed over, and the number of remaining action points to be handed over. Then, based on the other party and the number of points, the control section 55 sets the orientation in the virtual world indicated by the placement data Db1 of the player character set as the operation target character, to the orientation (the action) of handing over remaining action points and sets the orientation in the virtual world indicated by the placement data Db1 of the player character as the other party, to the orientation (the action) of receiving remaining action points, thereby updating the placement data Db1 of each player character.

Next, in accordance with the number of remaining action points to be handed over, the control section 55 reduces the remaining action points of the operation target character (step 112) and advances the processing to the next step. For example, based on the set number of remaining action points to be handed over, the control section 55 subtracts the number of points from the remaining action points indicated by the remaining action point data Db2 of the player character set as the operation target character, thereby updating the remaining action point data Db2.

Next, in accordance with the number of remaining action points to be handed over, the control section 55 increases the remaining action points of the player character as the other party to which remaining action points are to be handed over (step 113), and advances the processing to the next step. For example, based on the set number of remaining action points to be handed over, the control section 55 adds the number of points to the remaining action points indicated by the remaining action point data Db2 of the player character as the other party to which remaining action points are to be handed over, thereby updating the remaining action point data Db2.

Next, the control section 55 sets the consumption action points of each of the operation target character and the player character as the other party to which remaining action points are to be handed over, to 0 (step 114), and advances the processing to step 121 (see FIG. 21). For example, the control section 55 sets the consumption action points indicated by the consumption action point data Db3 of the player character set as the operation target character and the consumption action points indicated by the consumption action point data Db3 of the player character as the other party to which remaining action points are to be handed over, to 0, thereby updating the consumption action point data Db3 of each player character. If the player character set as the operation target character has handed over remaining action points to the other character as a result of the processes of steps 112 to 114, the remaining action points increase and/or decrease in accordance with the number of points to be handed over, and simultaneously, the consumption action points become 0, thereby settling the remaining action points of the player character.

Referring next to FIG. 21, in step 121, the control section 55 determines whether or not the operation target character has entered the ambush range of an enemy character set in the virtual world. For example, based on the placement position in the virtual world indicated by the placement data Db1 of the player character set as the operation target character and the ambush range in the virtual world indicated by the ambush range data Dc6 set by each enemy character, the control section 55 determines whether or not the operation target character has entered the ambush range of an enemy character, based on whether or not the placement position of the player character is included in any of the ambush ranges. Then, if the operation target character has entered the ambush range of an enemy character, the control section 55 advances the processing to step 122. If, on the other hand, the operation target character has not entered the ambush range of an enemy character, the control section 55 advances the processing to step 128. It should be noted that when it is determined whether or not the placement position of the player character is included in any of the ambush ranges, determinations may be made in multiple steps. For example, in a first determination, a determination is not made using the accurate ambush range, but a temporary determination is made using a rough ambush range including the ambush range (for example, the virtual world is divided into a plurality of blocks, and the block including the ambush range is set as a rough ambush range). Then, if it is determined in the temporary determination that the operation target character has entered the rough ambush range, a final determination regarding the placement position of the player character is made using the boundary line of the accurate ambush range. Determinations in two or more steps are thus made, whereby it is possible to reduce the processing load required for the determination of entry into the ambush range.

In step 122, the control section 55 determines whether or not the operation target character having entered the ambush range of an enemy character crosses the line of fire of an ambush attack set in the ambush range. For example, based on the placement position in the virtual world indicated by the placement data Db1 of the player character set as the operation target character and the line of fire of an ambush attack in the virtual world indicated by the ambush attack fire line data Dc5 of the enemy character having set the ambush range entered by the player character, if a predetermined range having its center at the placement position of the player character crosses the line of fire of an ambush attack, the control section 55 makes an affirmative determination in the above step 122. Then, if the operation target character crosses the line of fire of an ambush attack, the control section 55 advances the processing to step 123. If, on the other hand, the operation target character does not cross the line of fire of an ambush attack, the control section 55 advances the processing to step 126.

In step 123, the control section 55 performs the process of the operation target character being subjected to an ambush attack by the enemy character having set the ambush range in the virtual world and advances the processing to the next step. For example, in accordance with a predetermined algorithm, the control section 55 determines whether or not the ambush attack of the enemy character on the operation target character in the virtual world is to be successful. Then, the control section 55 sets damage to be inflicted on the operation target character when the ambush attack is successful. Then, based on the orientation in the virtual world indicated by the placement data Db1 of the player character set as the operation target character, the control section 55 sets the action of being subjected to the ambush attack by the enemy character. Based on the orientation of the enemy character indicated by the placement data Dc1, the control section 55 sets the action of the enemy character making the ambush attack. Then, the control section 55 updates the placement data Db1 and the placement data Dc1 using the orientations resulting from the set actions. Further, based on the determined success or failure of the ambush attack and the set damage to be inflicted on the operation target character, the control section 55 changes the parameter indicating the life indicated by the placement data Db1 of the player character set as the operation target character, thereby updating the placement data Db1. Further, the control section 55 reduces the remaining action points of the enemy character having made the ambush attack, by the number of points corresponding to the content of the attack in the ambush attack action and updates the remaining action point data Dc2 of the enemy character using the number of remaining action points resulting from the reduction.

Next, the control section 55 determines whether or not the enemy character having made the ambush attack in the above step 123 owns remaining action points required to make an ambush attack anew (step 124). For example, if the remaining action points indicated by the remaining action point data Dc2 of the enemy character having made the ambush attack are less than the number of points required for the enemy character to make an ambush attack anew, the control section 55 determines that the enemy character does not own remaining action points required for the ambush attack. Then, if the enemy character owns remaining action points required to make an ambush attack anew, the control section 55 advances the processing to step 133. If, on the other hand, the enemy character does not own remaining action points required to make an ambush attack anew, the control section 55 advances the processing to step 125.

In step 125, the control section 55 cancels the ambush range set by the enemy character having made the ambush attack in the above step 123 and advances the processing to step 133. For example, the control section 55 deletes the ambush range indicated by the ambush range data Dc6 of the enemy character having made the ambush attack in the above step 123, thereby canceling the ambush range.

If, on the other hand, it is determined in the above step 122 that the operation target character does not cross the line of fire of an ambush attack, the control section 55 performs the process of moving the line of fire of an ambush attack (step 126) and advances the processing to the next step. For example, based on the placement position in the virtual world indicated by the placement data Db1 of the player character set as the operation target character, the placement position in the virtual world indicated by the placement data Dc1 of the enemy character having set the ambush range entered by the player character, and the line of fire of an ambush attack in the virtual world indicated by the ambush attack fire line data Dc5 of the enemy character, the control section 55 moves the line of fire of an ambush attack at a predetermined angular velocity about the placement position of the enemy character so as to come close to the placement position of the player character. Then, the control section 55 updates the ambush attack fire line data Dc5 of the enemy character using the position of the line of fire of an ambush attack after the movement.

Next, the control section 55 performs the process of moving the ambush range (step 127) and advances the processing to step 133. For example, the control section 55 moves the ambush range in which the line of fire of an ambush attack moved in the above step 126 is set, to a position having its center on the line of fire of an ambush attack after the movement, and updates the ambush range data Dc6 corresponding to the moved ambush range, using the position of the ambush range after the movement.

If it is determined in the above step 121 that the operation target character has not entered the ambush range of an enemy character set in the virtual world, the control section 55 determines whether or not the operation target character is to perform another action in the virtual world. For example, if the operation data acquired in the above step 81 indicates the operation of causing the operation target character to perform another action, the control section 55 makes an affirmative determination in the above step 121. Then, if the operation target character is to perform another action, the control section 55 advances the processing to step 129. If, on the other hand, the operation target character is not to perform another action, the control section 55 advances the processing to step 133.

In step 129, the control section 55 performs the process of causing the operation target character to perform another action and advances the processing to the next step. For example, in accordance with the operation data, the control section 55 sets another action to be performed by the player character, based on the placement data Db1 of the player character set as the operation target character and the like, and updates the placement data Db1 and the like using the orientation resulting from the set action.

Next, in accordance with the content of the other action performed by the operation target character in the above step 129, the control section 55 reduces the remaining action points where necessary (step 130) and advances the processing to the next step. For example, if the number of points to be consumed in accordance with the content of the other action performed by the operation target character in the above step 129 is "1", the control section 55 subtracts 1 from the remaining action points indicated by the remaining action point data Db2 of the player character set as the operation target character, thereby updating the remaining action point data Db2.

Next, the control section 55 determines whether or not the other action performed by the operation target character in the above step 129 is an action for settling the remaining action points (step 131). For example, in this versus game, actions to be performed by the player character are classified into an action for settling the remaining action points and an action for not settling the remaining action points. In the above step 131, the determination is made based on this classification. As an example, if the player character has performed the action of obtaining a first item placed in the virtual world, or the player character has performed the operation of being found by an enemy, it may be determined that the other action is an action for settling the remaining action points. As another example, if the other action is the action of the player character obtaining a second item different in type from the first item placed in the virtual world, it may be determined the other action is an action for not settling the remaining action points. If the other action is the action of settling the remaining action points, the control section 55 advances the processing to step 132. If, on the other hand, the other action is an action for not settling the remaining action points, the control section 55 advances the processing to step 133.

In step 132, the control section 55 sets the consumption action points of the operation target character to 0 and advances the processing to step 133. For example, the control section 55 sets the consumption action points indicated by the consumption action point data Db3 of the player character set as the operation target character, to 0, thereby updating the consumption action point data Db3. If the player character set as the operation target character has performed the other action of settling the points as a result of the processes of steps 131 and 132, the remaining action points decrease in accordance with the content of the action, and simultaneously, the consumption action points become 0, thereby settling the remaining action points of the player character.

In step 133, in accordance with the action points of the player character set as the operation target character, the control section 55 performs the process of setting an action point gauge and displaying the action point gauge on the display section 52 and advances the processing to the next step. For example, based on the remaining action points and the consumption action points indicated by the remaining action point data Db2 and the consumption action point data Db3 of the player character set as the operation target character, the control section 55 sets the numbers and the placement positions of remaining action point images APr and consumption action point images APc to be displayed in an action point gauge G. Further, in accordance with the number of remaining action points to be consumed when the player character makes an attack, the control section 55 sets the size and the placement position of an attack consumption frame image B. Then, the control section 55 reads, from the image data Di, a VRAM (Video RAM), or the like, data necessary for generating a game image, thereby generating an image of the action point gauge G (see FIG. 2 to FIGS. 8 and 10), and stores the generated image in the VRAM.

Next, the control section 55 performs the process of generating a virtual world image to be displayed on the display section 52 and displaying the virtual world image on the display section 52 (step 134) and advances the processing to the next step. For example, the control section 55 reads, from the storage section 56, pieces of data representing the results of the player turn process, reads, from the image data Di, the VRAM, or the like, data necessary for generating a virtual world image, thereby generating a virtual world image, and stores the generated virtual world image in the VRAM so that the image of the action point gauge G is displayed in a superimposed manner. As an example, a virtual world image is generated as a three-dimensional (or two-dimensional) CG image obtained by: placing each player character in the virtual world based on the placement data Db1; placing each enemy character in the virtual world based on the placement data Dc1; and calculating the virtual world viewed from the virtual camera set for drawing and placed based on the virtual camera data Df.

Next, the control section 55 determines whether or not the player turn is to be ended (step 135). Examples of conditions for ending the player turn in the above step 135 include: the satisfaction of the condition under which the player turn is ended; and the fact that the user has performed the operation of ending the player turn. Then, if the player turn is to be ended, the control section 55 advances the processing to step 136. If, on the other hand, the player turn is to be ended, the control section 55 ends the processing of this subroutine.

In step 136, the control section 55 sets the player turn flag to off and the enemy turn flag to on and ends the processing of the subroutine. For example, the control section 55 sets the player turn flag to off, thereby updating the player turn flag data Dg, and sets the enemy turn flag to on, thereby updating the enemy turn flag data Dh.

With reference to FIG. 22, a description is given of the enemy turn process performed in the above step 69.

Referring to FIG. 22, the control section 55 acquires operation data from the input section 51, thereby updating the operation data Da (step 141), and advances the processing to the next step.

Next, the control section 55 selects from among a plurality of enemy characters an enemy character to perform an action, causes the enemy character to perform an action in the virtual world based on a predetermined algorithm (step 142), and advances the processing to the next step. For example, in accordance with the above action, the control section 55 updates the placement data Dc1 of the enemy character having performed the above action.

Next, in accordance with the content of the action performed by the enemy character in the above step 142, the control section 55 reduces the remaining action points where necessary (step 143) and advances the processing to the next step. For example, if the number of points to be consumed in accordance with the content of the action performed by the enemy character in the above step 142 is "1", the control section 55 subtracts 1 from the remaining action points indicated by the remaining action point data Dc2 of the enemy character having performed the action, thereby updating the remaining action point data Dc2.

Next, the control section 55 determines whether or not there is a player character (a corresponding target character) set as a corresponding target by the action of the enemy character performed in the above step 142 (step 144). Here, a corresponding target character is a player character which, when an enemy character has performed an action, has the degree of association with the enemy character greater than a predetermined threshold and is most related to the enemy character. Then, if there is a corresponding target character, the control section 55 updates the corresponding target character data De using data representing the player character selected as the corresponding target character and advances the processing to step 145. If, on the other hand, there is not a corresponding target character, the control section 55 advances the processing to step 147.

In step 145, the control section 55 selects a virtual camera corresponding to the corresponding target character for drawing and advances the processing to the next step. For example, the control section 55 sets, as a virtual camera used for displaying a virtual world image on the display section 52, a virtual camera set so as to correspond to the corresponding target character indicated by the corresponding target character data De, thereby updating the virtual camera data Df for distinguishing the set virtual camera.

Next, the control section 55 performs a process on the player character set as the corresponding target character where necessary (step 146) and advances the processing to step 147. For example, in accordance with the content of the setting of the player character as the corresponding target character, the control section 55 performs a process on the player character. As a first example, if the player character has been set as the corresponding target character by being found by (entering the range of field of view of) an enemy character, the control section 55 sets an action indicating that the player character has been found by the enemy character, and updates the placement data Db1 of the player character using the orientation resulting from the set action. As a second example, if the player character has been set as the corresponding target character by being attacked by an enemy character, the control section 55 sets the action of being attacked by the enemy character and damage resulting from the attack and updates the placement data Db1 of the player character using the orientation and the damage resulting from the set action. As a third example, if the player character has been set as the corresponding target character by an enemy character entering the ambush range of the player character, the control section 55 sets the action of making an ambush attack on the enemy character and updates the placement data Db1 of the player character using the orientation resulting from the set action.

It should be noted that if the player character set as the corresponding target has set an ambush range, the position of the ambush range may be changed toward the enemy character having set the corresponding target. In this case, the direction of the line of fire of an ambush attack of the player character is changed toward the enemy character having set the player character as the corresponding target, at a predetermined angular velocity about the position of the player character, thereby updating the ambush attack fire line data Db5 of the player character. Then, the ambush range of the player character is moved to a position having its enter on the line of fire of an ambush attack of the player character after the movement, and the ambush range data Db6 of the player character is updated using the position of the ambush range after the movement.

In step 147, the control section 55 determines whether or not to set the enemy character to make an ambush attack on the player character in the virtual world. Then, if the enemy character is to be set to make an ambush attack, the control section 55 advances the processing to step 148. If, on the other hand, the enemy character is not to be set to make an ambush attack, the control section 55 advances the processing to step 149.

In step 148, the control section 55 performs the process of setting an ambush range and the line of fire of an ambush attack in the virtual world and advances the processing to step 149. For example, based on the enemy character set to make an ambush attack, the control section 55 sets as an ambush range a range having a predetermined angle to each of the left and right of the enemy character and also a range except for the blind spot of the enemy character and sets the ambush range data Dc6 of the enemy character using data representing the ambush range in the virtual world. Further, the control section 55 sets the line of fire of an ambush attack in the direction from the enemy character to the front (the center of the ambush range) in the virtual world and sets the ambush attack fire line data Dc5 of the enemy character using data representing the line of fire of an ambush attack in the virtual world.

In step 149, the control section 55 determines whether or not the operation of moving the virtual camera has been performed. For example, if the operation data acquired in the above step 141 indicates the operation of moving the virtual camera, the control section 55 makes an affirmative determination in the above step 149. Then, if the virtual camera is to be moved, the control section 55 advances the processing to step 150. If, on the other hand, the virtual camera is not to be moved, the control section 55 advances the processing to step 161 (see FIG. 23).

In step 150, in accordance with the operation data acquired in the above step 141, the control section 55 changes the position and/or the orientation of the virtual camera set for drawing and advances the processing to step 161 (see FIG. 23). For example, based on the initial position and the initial orientation set for the virtual camera set for drawing, the control section 55 changes the position and/or the orientation of the virtual camera within a predetermined range (e.g., within 30° upward, downward, leftward, and rightward with respect to the corresponding target character) in accordance with the operation data acquired in the above step 141 and updates the virtual camera data Df using the position and/or the orientation of the virtual camera after the change.

Referring next to FIG. 23, in step 161, the control section 55 determines whether or not an enemy character has entered the ambush range of the player character set in the virtual world. For example, based on the placement position in the virtual world indicated by the placement data Dc1 of an enemy character as an action target at the current moment and the ambush range in the virtual world indicated by the ambush range data Db6 set by each player character, the control section 55 determines whether or not the enemy character has entered the ambush range of the player character, based on whether or not the placement position of the enemy character is included in any of the ambush ranges. Then, if the enemy character has entered the ambush range of the player character, the control section 55 advances the processing to step 162. If, on the other hand, the enemy character has not entered the ambush range of the player character, the control section 55 advances the processing to step 171. It should be noted that the method for determining whether or not the character has entered the ambush range is similar to that in step 121 described above, and therefore is not described in detail.

In step 162, the control section 55 determines whether or not the enemy character having entered the ambush range of the player character crosses the line of fire of an ambush attack set in the ambush range. For example, based on the placement position in the virtual world indicated by the placement data Dc1 of the enemy character having entered the ambush range of the player character and the line of fire of an ambush attack in the virtual world indicated by the ambush attack fire line data Db5 of the player character having set the ambush range entered by the enemy character, if a predetermined range having its center at the placement position of the enemy character crosses the line of fire of an ambush attack, the control section 55 makes an affirmative determination in the above step 162. Then, if the enemy character crosses the line of fire of an ambush attack, the control section 55 advances the processing to step 163. If, on the other hand, the enemy character does not cross the line of fire of an ambush attack, the control section 55 advances the processing to step 169.

In step 163, the control section 55 performs the process of the enemy character being subjected to an ambush attack by the player character having set the ambush range in the virtual world and advances the processing to the next step. For example, in accordance with a predetermined algorithm, the control section 55 determines whether or not the ambush attack of the player character on the enemy character in the virtual world is to be successful. Then, the control section 55 sets damage to be inflicted on the enemy character when the ambush attack is successful. Then, the control section 55 sets the action of being subjected to the ambush attack by the player character based on the orientation in the virtual world indicated by the placement data Dc1 of the enemy character, also sets the action of the player character making the ambush attack based on the orientation of the player character indicated by the placement data Db1 of the player character to make the ambush attack, and updates the placement data Dc1 and the placement data Db1 using the orientations resulting from the set actions. Further, based on the determined success or failure of the ambush attack and the set damage to be inflicted on the enemy character, the control section 55 changes the parameter indicating the life indicated by the placement data Dc1 of the enemy character, thereby updating the placement data Dc1.

Next, in accordance with the content of the attack in the performed ambush attack action, the control section 55 reduces the remaining action points of the player character (step 164) and advances the processing to the next step. For example, the control section 55 reduces the remaining action points of the player character having made the ambush attack, by the number of points corresponding to the content of the attack in the ambush attack action and updates the remaining action point data Db2 of the player character using the number of remaining action points resulting from the reduction.

Next, the control section 55 determines whether or not to give a special effect to the enemy character subjected to the ambush attack action (step 165). Here, the special effect refers to an effect that is not obtained when a player character attacks an enemy character during a player turn. For example, the special effect is the effect of making the enemy character incapable of performing an action when subjected to the ambush attack, or the effect of inflicting relatively great damage on the enemy character. A special effect is given to the enemy character subjected to the ambush attack action with a predetermined probability. Then, if a special effect is to be given to the enemy character subjected to the ambush attack action, the control section 55 advances the processing to step 166. If, on the other hand, a special effect is not to be given to the enemy character subjected to the ambush attack action, the control section 55 advances the processing to step 167.

In step 166, the control section 55 performs the process of giving a special effect to the enemy character subjected to the ambush attack action and advances the processing to step 167. For example, if the special effect to be given to the enemy character is the effect of making the enemy character incapable of performing an action, the control section 55 sets the remaining action points indicated by the remaining action point data Dc2 of the enemy character subjected to the ambush attack action, to 0, thereby updating the remaining action point data Dc2. Further, if the special effect to be given to the enemy character is the effect of inflicting relatively great damage, the control section 55 further reduces the life of the enemy character subjected to the ambush attack action, thereby updating the placement data Db1 of the enemy character.

In step 167, the control section 55 determines whether or not the player character having made the ambush attack in the above step 163 owns remaining action points required to make an ambush attack anew. For example, if the remaining action points indicated by the remaining action point data Db2 of the player character having made the ambush attack are less than the number of points required for the player character to make an ambush attack anew, the control section 55 determines that the player character does not own remaining action points required for the ambush attack. Then, if the player character owns remaining action points required to make an ambush attack anew, the control section 55 advances the processing to step 171. If, on the other hand, the player character does not own remaining action points required to make an ambush attack anew, the control section 55 advances the processing to step 168.

It should be noted that if the player character having made the ambush attack in the above step 163 owns remaining action points required to make an ambush attack anew, the player character may continuously make an ambush attack anew on the same enemy character on which the player character has made the ambush attack. In this case, the player character having made the ambush attack in the above step 163 continues to make an ambush attack on the same enemy character until the number of remaining action points becomes less than the number of points required to make an ambush attack.

In step 168, the control section 55 cancels the ambush range set by the player character having made the ambush attack in the above step 163 and advances the processing to step 171. For example, the control section 55 deletes the ambush range indicated by the ambush range data Db6 of the player character having made the ambush attack in the above step 163, thereby canceling the ambush range.

If, on the other hand, it is determined in the above step 162 that the enemy character having entered the ambush range does not cross the line of fire of an ambush attack, the control section 55 performs the process of moving the line of fire of an ambush attack of the player character (step 169) and advances the processing to the next step. For example, based on the placement position in the virtual world indicated by the placement data Dc1 of the enemy character having entered the ambush range, the placement position in the virtual world indicated by the placement data Db1 of the player character having set the ambush range entered by the enemy character, and the line of fire of an ambush attack in the virtual world indicated by the ambush attack fire line data Db5 of the player character, the control section 55 moves the line of fire of an ambush attack at a predetermined angular velocity about the placement position of the player character so as to come close to the placement position of the enemy character. Then, the control section 55 updates the ambush attack fire line data Db5 of the player character using the position of the line of fire of an ambush attack after the movement.

Next, the control section 55 performs the process of moving the ambush range of the player character (step 170) and advances the processing to step 171. For example, the control section 55 moves the ambush range in which the line of fire of an ambush attack moved in the above step 169 is set, to a position having its center on the line of fire of an ambush attack after the movement, and updates the ambush range data Db6 corresponding to the moved ambush range, using the position of the ambush range after the movement.

In step 171, in accordance with the action points of the player character for which the virtual camera for drawing has been set, the control section 55 performs the process of setting an action point gauge and displaying the action point gauge on the display section 52 and advances the processing to the next step. For example, based on the remaining action points and the consumption action points indicated by the remaining action point data Db2 and the consumption action point data Db3 of the player character for which the virtual camera for drawing has been set (e.g., the corresponding target character or the player character having performed an action last in the most recent player turn), the control section 55 sets the numbers and the placement positions of remaining action point images APr and consumption action point images APc to be displayed in an action point gauge G. Further, in accordance with the number of remaining action points to be consumed when the player character makes an attack, the control section 55 sets the size and the placement position of an attack consumption frame image B. Then, the control section 55 reads, from the image data Di, the VRAM (Video RAM), or the like, data necessary for generating a game image, thereby generating an image of the action point gauge G (see FIG. 13), and stores the generated image in the VRAM.

Next, the control section 55 performs the process of generating a virtual world image to be displayed on the display section 52 and displaying the virtual world on the display section 52 (step 172) and advances the processing to the next step. For example, the control section 55 reads, from the storage section 56, pieces of data representing the results of the enemy turn process and reads, from the image data Di, the VRAM, of the like, data necessary for generating a virtual world image, thereby generating a virtual world image, and stores the generated virtual world image in the VRAM so that the image of the action point gauge G is displayed in a superimposed manner. As an example, a virtual world image is generated as a three-dimensional (or two-dimensional) CG image obtained by: placing each player character in the virtual world based on the placement data Db1; placing each enemy character in the virtual world based on the placement data Dc1; and calculating the virtual world viewed from the virtual camera set for drawing and placed based on the virtual camera data Df. It should be noted that the image of the action point gauge G may not be displayed, superimposed on the virtual world image during the enemy turn. For example, if remaining action points do not remain for the player character for which the virtual camera for drawing has been set, or if the player character is not performing an action such as an ambush attack, the image of the action point gauge G may not be displayed, superimposed on the virtual world image.

Next, the control section 55 determines whether or not the enemy turn is to be ended (step 173). Examples of conditions for ending the enemy turn in the above step 173 include: the satisfaction of the condition under which the enemy turn is ended. Then, if the enemy turn is to be ended, the control section 55 advances the processing to step 174. If, on the other hand, the enemy turn is not to be ended, the control section 55 ends the processing of the subroutine.

In step 174, the control section 55 sets the player turn flag to on and the enemy turn flag to off and ends the processing of the subroutine. For example, the control section 55 sets the player turn flag to on, thereby updating the player turn flag data Dg, and sets the enemy turn flag to off, thereby updating the enemy turn flag data Dh.

It should be noted that the above descriptions have been given using an example where the information processing apparatus 5 performs the information processing (the game processing). Alternatively, another apparatus other than the information processing apparatus 5 may perform at least some of the processing steps in the processing. For example, if the information processing apparatus 5 is further configured to communicate with another apparatus other than the information processing apparatus 5 (e.g., another server, another game apparatus, or another mobile terminal), the other apparatus may cooperate to perform the processing steps of the processing. Another apparatus may thus perform at least some of the processing steps in the processing, which enables processing similar to that described above. Further, the processing described above can be performed by a processor or the cooperation of a plurality of processors, the processor or the plurality of processors included in an information processing system including at least one information processing apparatus. Further, in the above exemplary embodiment, the processing of the flow charts described above is performed by the control section 55 of the information processing apparatus 5 executing a predetermined program. Alternatively, part or all of the processing of the flow charts may be performed by a dedicated circuit included in the information processing apparatus 5.

Here, the above variations make it possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step in the above processing. Thus, it goes without saying that it is possible to achieve the exemplary embodiment by sharing the processing in any manner.

In addition, the processing orders, the setting values, the conditions used in the determinations, and the like that are used in the game processing described above are merely illustrative. Thus, it goes without saying that the exemplary embodiment can be achieved also with other orders, other values, and other conditions. Further, the above exemplary embodiment has been described using game processing, taking a versus game as an example. Alternatively, the exemplary embodiment can be achieved not only by a versus game but also by another game.

In addition, the information processing program (the game program) may be supplied to the information processing apparatus 5 not only through an external storage medium such as an external memory, but also through a wired or wireless communication link. Further, the program may be stored in advance in a non-volatile storage device included in the information processing apparatus 5. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a game program, a game apparatus, a game system, a game processing method, and the like in order, for example, to further increase the level of strategy of a game.

What is claimed is:

1. A computer-readable storage medium having stored therein a game program executed by a computer capable of executing a game that advances by alternately repeating a player turn, in which a player character can perform an action in a virtual world in accordance with a player input, and an opponent turn, in which an opponent character can perform an opponent character action, the computer included in an information processing apparatus, the game program causing the computer to execute:
 acquiring an input;
 causing a player character to perform the action in accordance with the input;
 setting action points that allow the player character to perform the action in the virtual world during a player turn, and subtracting a point from the action points in accordance with the action of the player character during the player turn;
 setting in the virtual world a trigger range for triggering the action of the player character in the opponent turn; and
 ending the player turn and starting the opponent turn, wherein
 in causing the player character to perform the action, if the action points remain at a time of the end of the player turn and if a non-player character has entered the trigger range in the opponent turn executed subsequently to the player turn, the player character is caused to automatically perform an action on the non-player character in the opponent turn, and a point is subtracted during the opponent turn from the action points in accordance with the action of the player character performed during the opponent turn; and
 if no action points remain at the time of the end of the player turn, then the automatic action of the player character is not performed in the opponent turn.

2. The computer-readable storage medium having stored therein the game program according to claim 1, wherein
 in the setting of the trigger range, in accordance with the fact that a non-player character has performed a predetermined action on the player character in the opponent turn, a position of the trigger range is changed based on a position of the non-player character.

3. The computer-readable storage medium having stored therein the game program according to claim 1, wherein
 in the setting of the trigger range, in accordance with the fact that the player character has performed a predetermined action on a non-player character in the opponent turn, a position of the trigger range is changed based on a position of the non-player character.

4. The computer-readable storage medium having stored therein the game program according to claim 1, wherein
 in causing the player character to perform the action, if a non-player character has entered the trigger range in the opponent turn, and then, the non-player character has moved out of the trigger range within a predetermined time, the automatic action is not performed on the non-player character.

5. The computer-readable storage medium having stored therein the game program according to claim 1, wherein
 under the condition that the action points remain at a time of the end of the player turn and a non-player character has entered the trigger range in the opponent turn executed subsequently to the player turn, the action to be performed on the non-player character by the player character is a specific action that can be performed if the condition is satisfied.

6. A computer-readable storage medium having stored therein a game program executed by a computer capable of executing a game that advances by alternately repeating a player turn, in which a player character can perform the action in a virtual world in accordance with a player input, and an opponent turn, in which an opponent character can perform an opponent character action, the computer included in an information processing apparatus, the game program causing the computer to execute:
 acquiring an input;
 causing a player character to perform the action in accordance with the input;
 setting action points that allow the player character to perform the action in the virtual world during a player turn, and subtracting a point from the action points in accordance with the action of the player character during the player turn; and
 ending the player turn and starting the opponent turn, wherein
 in causing the player character to perform the action, if the action points remain at a time of the end of the player turn, an automatic action of the player character corresponding to the number of the remaining action points is automatically enabled in the opponent turn executed subsequently to the player turn, and a point is subtracted during the opponent turn from the action points in accordance with the action of the player character performed during the opponent turn; and
 if no action points remain at the time of the end of the player turn, then the automatic action of the player character is not performed in the opponent turn executed subsequently to the player turn.

7. The computer-readable storage medium having stored therein the game program according to claim 6, wherein
 in causing the player character to perform the action, if the action points remain at the time of the end of the player turn, an automatic action of the player character is automatically enabled the number of times corresponding to the number of the remaining action points in the opponent turn executed subsequently to the player turn.

8. The computer-readable storage medium having stored therein the game program according to claim 6, wherein
 under the condition that the action points remain at the time of the end of the player turn, the action to be automatically performed by the player character in the opponent turn is a specific action that can be performed if the condition is satisfied.

9. A game apparatus capable of executing a game that advances by alternately repeating a player turn, in which a player character can perform the action in a virtual world in accordance with a player input, and an opponent turn, in which an opponent character can perform an opponent character action, the game apparatus comprising one or more processors configured to:
 acquire an input;
 cause a player character to perform the action in accordance with the input;
 set action points that allow the player character to perform the action in the virtual world during a player turn, and subtract a point from the action points in accordance with the action of the player character during the player turn;

set in the virtual world a trigger range for triggering an
action of the player character in the opponent turn; and
end the player turn and start the opponent turn, wherein
in causing the player character to perform the action, if the
action points remain at a time of the end of the player
turn and if a non-player character has entered the
trigger range in the opponent turn executed subsequently to the player turn, the player character is caused
to automatically perform the action on the non-player
character in the opponent turn, and a point is subtracted
during the opponent turn from the action points in
accordance with the action of the player character
performed during the opponent turn; and
if no action points remain at the time of the end of the
player turn, then the automatic action of the player
character is not performed in the opponent turn.

10. A game apparatus capable of executing a game that advances by alternately repeating a player turn, in which a player character can perform an action in a virtual world in accordance with a player input, and an opponent turn, in which an opponent character can perform an opponent character action, the game apparatus comprising one or more processors configured to:
acquire an input;
cause a player character to perform the action in accordance with the input;
set action points that allow the player character to perform the action in the virtual world during a player turn, and subtract a point from the action points in accordance with the action of the player character during the player turn; and
end the player turn and start the opponent turn, wherein
in causing the player character to perform the action, if the action points remain at a time of the end of the player turn, an automatic action of the player character corresponding to the number of the remaining action points is automatically enabled in the opponent turn executed subsequently to the player turn, and a point is subtracted during the opponent turn from the action points in accordance with the action of the player character performed during the opponent turn; and
if no action points remain at the time of the end of the player turn, then the automatic action of the player character is not performed in the opponent turn executed subsequently to the player turn.

11. A game system including a plurality of apparatuses capable of communicating with each other, the game system capable of executing a game that advances by alternately repeating a player turn, in which a player character can perform an action in a virtual world in accordance with a player input, and an opponent turn, in which an opponent character can perform an opponent character action, the game system comprising one or more processors configured to:
acquire an input;
cause a player character to perform the action in accordance with the input;
set action points that allow the player character to perform the action in the virtual world during a player turn, and subtract a point from the action points in accordance with the action of the player character during the player turn;
set in the virtual world a trigger range for triggering the action of the player character in the opponent turn; and
end the player turn and start the opponent turn, wherein
in causing the player character to perform the action, if the action points remain at a time of the end of the player turn and if a non-player character has entered the trigger range in the opponent turn executed subsequently to the player turn, the player character is caused to automatically perform the action on the non-player character in the opponent turn, and a point is subtracted during the opponent turn from the action points in accordance with the action of the player character performed during the opponent turn; and
if no action points remain at the time of the end of the player turn, then the automatic action of the player character is not performed in the opponent turn.

12. A game system including a plurality of apparatuses capable of communicating with each other, the game system capable of executing a game that advances by alternately repeating a player turn, in which a player character can perform an action in a virtual world in accordance with a player input, and an opponent turn, in which an opponent character can perform an opponent character action, the game system comprising one or more processors configured to:
acquire an input;
cause a player character to perform the action in accordance with the input;
set action points that allow the player character to perform the action in the virtual world during a player turn, and subtract a point from the action points in accordance with the action of the player character during the player turn; and
end the player turn and start the opponent turn, wherein
in causing the player character to perform the action, if the action points remain at a time of the end of the player turn, an automatic action of the player character corresponding to the number of the remaining action points is automatically enabled in the opponent turn executed subsequently to the player turn, and a point is subtracted during the opponent turn from the action points in accordance with the action of the player character performed during the opponent turn; and
if no action points remain at the time of the end of the player turn, then the automatic action of the player character is not performed in the opponent turn executed subsequently to the player turn.

13. A game processing method executed by a processor or cooperation of a plurality of processors, the processor or the plurality of processors included in a system including an apparatus capable of executing a game that advances by alternately repeating a player turn, in which a player character can perform an action in a virtual world in accordance with a player input, and an opponent turn, in which an opponent character can perform an opponent character action, the game processing method comprising:
acquiring an input;
causing a player character to perform the action in accordance with the input;
setting action points that allow the player character to perform the action in the virtual world during a player turn, and subtracting a point from the action points in accordance with the action of the player character during the player turn;
setting in the virtual world a trigger range for triggering the action of the player character in the opponent turn; and
ending the player turn and starting the opponent turn, wherein
in causing the player character to perform the action, if the action points remain at a time of the end of the player turn and if a non-player character has entered the trigger range in the opponent turn executed subsequently to the player turn, the player character is caused to automatically perform the action on the non-player character in the opponent turn, and a point is subtracted during the opponent turn from the action points in accordance with the action of the player character performed during the opponent turn; and if no action points remain at the time of the end of the player turn, then the automatic action of the player character is not performed in the opponent turn.

14. A game processing method capable of executing a game that advances by alternately repeating a player turn, in which a player character can perform an action in a virtual world in accordance with a player input, and an opponent turn, in which an opponent character can perform an opponent character action, the game processing method comprising:

acquiring an input;

causing a player character to perform the action in accordance with the input;

setting action points that allow the player character to perform the action in the virtual world during a player turn, and subtracting a point from the action points in accordance with the action of the player character during the player turn; and ending the player turn and starting the opponent turn, wherein in causing the player character to perform the action, if the action points remain at a time of the end of the player turn, an automatic action of the player character corresponding to the number of the remaining action points is automatically enabled in the opponent turn executed subsequently to the player turn, and a point is subtracted during the opponent turn from the action points in accordance with the action of the player character performed during the opponent turn; and if no action points remain at the time of the end of the player turn, then the automatic action of the player character is not performed in the opponent turn executed subsequently to the player turn.

* * * * *